US008560523B2

(12) United States Patent
Larson et al.

(10) Patent No.: US 8,560,523 B2
(45) Date of Patent: Oct. 15, 2013

(54) VIEW MATCHING OF MATERIALIZED XML VIEWS

(75) Inventors: Per-Ake Larson, Redmond, WA (US); Guido Moerkotte, Schriesheim (DE); Frank W. Tompa, Waterloo (CA); Jingren Zhou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 12/146,506

(22) Filed: Jun. 26, 2008

(65) Prior Publication Data

US 2009/0327255 A1     Dec. 31, 2009

(51) Int. Cl.
*G06F 17/30*     (2006.01)

(52) U.S. Cl.
USPC .............................. 707/717; 707/705; 707/713

(58) Field of Classification Search
USPC .......................................... 707/717, 705, 713
See application file for complete search history.

(56) References Cited

U.S. PATENT DOCUMENTS

| | | | |
|---|---|---|---|
| 6,546,381 B1 | 4/2003 | Subramanian et al. | |
| 6,629,094 B1 | 9/2003 | Colby et al. | |
| 6,721,727 B2 | 4/2004 | Chau et al. | |
| 6,785,673 B1 | 8/2004 | Fernandez et al. | |
| 6,865,569 B1* | 3/2005 | Gui et al. ............................. | 1/1 |
| 7,213,200 B2 | 5/2007 | Abe et al. | |
| 7,315,852 B2 | 1/2008 | Balmin et al. | |
| 2003/0088541 A1* | 5/2003 | Zilio et al. ........................ | 707/1 |
| 2003/0093415 A1* | 5/2003 | Larson et al. ..................... | 707/3 |
| 2005/0091180 A1* | 4/2005 | Peleg et al. ....................... | 707/1 |
| 2005/0097084 A1* | 5/2005 | Balmin et al. .................... | 707/3 |
| 2006/0230017 A1* | 10/2006 | Larson et al. ..................... | 707/2 |
| 2006/0253430 A1 | 11/2006 | Fernandes et al. | |
| 2007/0083489 A1 | 4/2007 | Lawande | |
| 2007/0250473 A1 | 10/2007 | Larson et al. | |

OTHER PUBLICATIONS

Article entitled "Optimizing Queries Using Materialized Views: A Practical, Scalable Solution" by Goldstein et al. dated May 2001.*
Article entitled "view matching for outer-join views" by Larson et al., dated 2005.*
Haw, et al., "Query Optimization Techniques for XML Databases", International Journal of Information Technology vol. 2, No. 2, Jan. 28, 2005, pp. 97-104.
Manolescu, et al., "Structured Materialized Views for XML Queries", May 13, 2006, pp. 1-23.
Arion, et al., "Algebra-based identification of tree patterns in XQuery", Flexible Query Answering Systems, vol. 4027, Jun. 15, 2006, pp. 13-25.

(Continued)

*Primary Examiner* — Mahesh Dwivedi

(57) ABSTRACT

A materialized XML view matching system and method for processing of SQLXML queries using view matching of materialized XML views. The view matching process of the embodiments of the system and method use a multi-path tree (MPT) data structure. Embodiments of the materialized XML view matching system and method construct an MPT data structure for each input query and view expression. View matching is performed on the MPT data structures to generate a set of partial matches, which then are cleaned to generate a set of candidate matches. A valid match definition is generated by testing each candidate match for different forms of compliance. Using the valid match definition, a set of valid matches is identified and extracted. For each valid match, a substitute query expression is constructed that can serve as a replacement for the original query. These substitute queries can be used to evaluate the original query.

20 Claims, 16 Drawing Sheets

(56) References Cited

OTHER PUBLICATIONS

Zaharioudakis, et al., "Answering Complex SQL Queries Using Automatic Summary Tables", ACM SIGMOD Record, vol. 29, Jun. 2000, pp. 105-116.

Eisenberg, et al., "Advancements in SQL/XML", ACM SIGMOD Record, vol. 33, Sep. 2004, pp. 79-86.

Goldstein, et al., "Optimizing Queries Using Materialized Views: A Practical, Scalable Solution" ACM SIGMOD, May 2001, pp. 1-12.

Miklau, et al., "Containment and Equivalence for an XPath Fragment", Proceedings of the twenty-first ACM SIGMOD-SIGACT-SIGART symposium on Principles of database systems, Jun. 3-6, 2002, pp. 65-76.

Ravi Sethi, "Testing for the Church-Rosser Property", Journal of the ACM, vol. 21, Issue 4, Oct. 1974, pp. 671-679.

Shah, A., and R. Chirkova, Improving query performance using materialized XML views: A learning-based approach, Proc. 1st Int. Workshop on XML Schema and Data Management (XSDM), Oct. 2003, pp. 297-310.

Tang, N., J. X. Yu, M. T. Ozsu, B. Choi, K.-F. Wong, Multiple materialized view selection for XPath query rewriting, IEEE 24th Int'l Conf. on Data Engineering, Apr. 2008, pp. 873-882.

Schmidt, A., XMark—An XML Benchmark Project, Jun. 28, 2003, retrieved Jan. 28, 2008 http://www.xml-benchmark.org/.

Balmin, A., and F. Özcan, K. S. Beyer, R. J. Cochrane and H. Pirahesh, A framework for using materialized XPath views in XML query processing, Proc. of the Thirtieth Int'l Conf. on Very Large Data Bases, Aug.-Sep. 2004, pp. 60-71, vol. 30.

Blakely, J. A. and N. L. Martin, Join index, materialized view, and hybrid-hash join: A performance analysis, Proc. of the Sixth Int'l Conf. on Data Engineering, Feb. 1990, pp. 256-263, IEEE Computer Society, Washington, DC, USA.

Chaudhuri, S., R. Krishnamurthy, S. Potamianos, K. Shim, Optimizing queries with materialized views, 11th Int'l Conf. on Data Engineering, Mar. 1995, pp. 190-200, IEEE Computer Society, Washington, DC, USA.

Levy, A. Y., A. O. Mendelzon, Y. Sagiv, Answering queries using views, Proc. of the Fourteenth ACM SIGACT-SIGMOD-SIGART Symposium on Principles of Database Systems, May 1995, pp. 95-104.

Mandhani, B., and D. Suciu, Query caching and view selection for XML databases, Proc. of the 31st Int'l Conf. on Very Large Data Bases, Sep. 2005, pp. 469-480.

O'Neil, P., E. O'Neil, S. Pal, I. Cseri, G. Schaller, N. Westbury, ORDPATHs: Insert-friendly XML node labels, Proc. of the 2004 ACM SIGMOD Int'l Conf. on Management of Data, Jun. 2004, pp. 903-908.

Pal, S., I. Cseri, O. Seeliger, M. Rys, G. Schaller, W. Yu, D. Tomic, A. Baras, B. Berg, D. Churin and E. Kogan, XQuery implementation in a relational database system, Proc. of the 31st Int'l Conf. on Very Large Data Bases, Aug.-Sep. 2005, pp. 1175-1186.

Xu, W., Z. M. Özsoyoglu, Rewriting XPath queries using materialized views, Proc. of the 31st Int'l Conf. on Very Large Data Bases, Aug.-Sep. 2005, pp. 121-132.

Moerkotte, G., Incorporating XSL processing into database engines, Proc. of the 28th Int'l Conf. on Very Large Data Bases, Aug. 2002, pp. 107-118.

\* cited by examiner

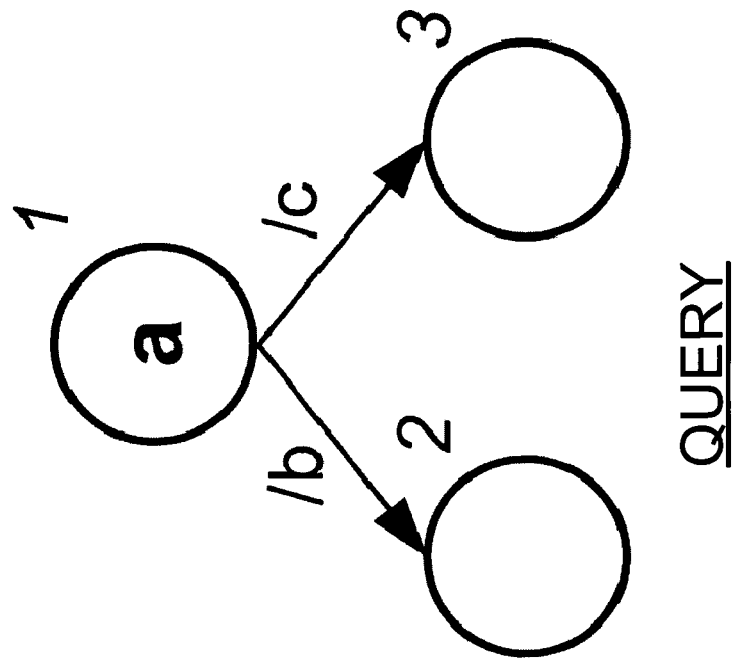
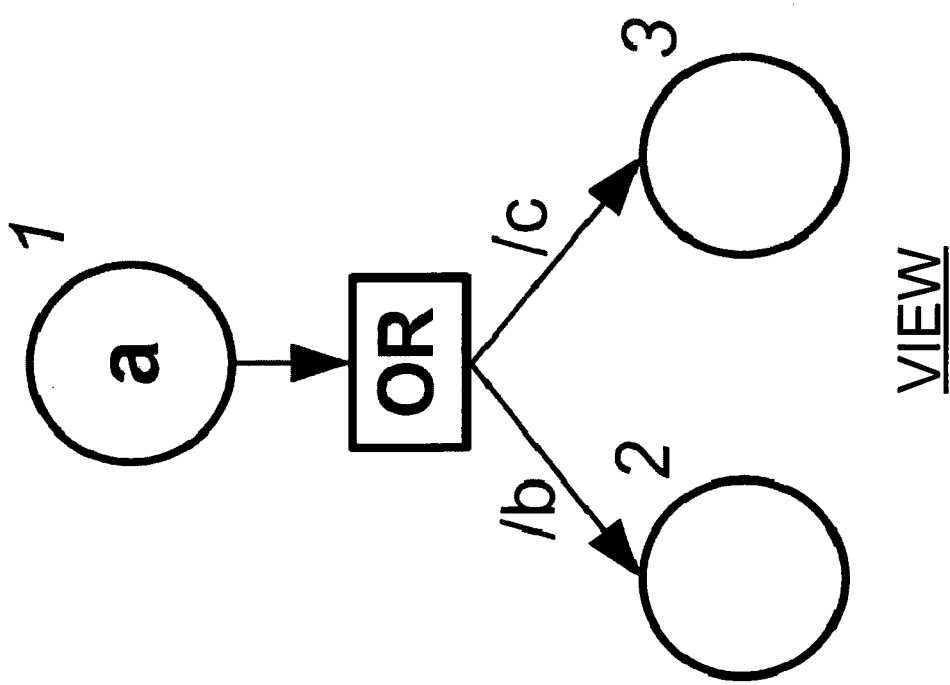
FIG. 9

QUERY'

```
bool MatchViewQuery(V,Q) {
    // All cells M(x,y) are initially undefined
    bool lRes = RootCompliance(V, Q) &&
                Match(V.asAnd(), Q.asAnd(), M);
    if (lRes) Cleanup();
    return(lRes);
}
```

FIG. 11

```
bool Match(x, y, M) {
// Pre: neither x nor y are OR nodes or NIL nodes
// Post: returns whether subtree rooted at x can be
//       mapped to subtree rooted at y if M(x,y).defined()  //check the cache
      return M(x,y);

if ((x.isAnd() != y.isAnd()) ||   //types must match
      !covers(x.nt(), y.nt()) ||
      !(y.restriction() ==> x.restriction()))
    return false;

bool lRes = true;           //every V conjunct must match
  forall(x' in x.succ()) {
    bool lRes2 = false;       //some Q node must be matched
    forall (y' in y.succ())   // could be a conjunct in Q
        lRes2 |= IsLink(x', y', x, y, M);
                              // or could treat Q node as AND
    if (x'.isOr() && !y.isAnd())
        lRes2 |= IsLink(x', y.asAND(), x, y, M); // *
    lRes &= lRes2;
    }
  return lRes;
}
```

FIG. 12

```
bool IsLink(x, y, px, py, M) {
  // Pre: MPTs rooted at x and y are in TDNF;
  // Post: returns whether subtree rooted at x can be
  //    mapped to subtree rooted at y and if so,
  //    records (x,y,px,py) in LINKS as needed if (M(x,y).defined() &&    //check the cache
      (!(x.isRegular() && x.axis.isDescendant()))) {
                              //if x refers to one node only
    insertMatch(M(x,y), x, y, px, py);
    return M(x,y);
  } recordMatch = true; //usually record match in LINKS if (x.isNil()) lRes = true;  //Case 1: nothing to match
  else if (y.isOr()) {                          //Case 2
    lRes = true;  //every disjunct in Q matched by V
    forall(y' in y.succ())
      lRes &= IsLink(x, y', x, y, M);
  } else if (x.isOr()) {                         //Case 3
      if (y.isAnd() && y.succ().isOr())          //Case 3a
        lRes = IsLink(x, y.succ(), x, y, M);
      else {                                     //Case 3b
        lRes = false; //some disjunct in V matches Q
        forall(x' in x.succ())
          lRes |= IsLink(x', y, x, y, M);
      }
  } else if (x.isAnd) {                          //Case 4
      if (y.isAnd())                             //Case 4a
        lRes = match(x, y, M); //match AND-AND
      else {                                     //Case 4b
        recordMatch = false; //AND-reg match is not a LINK
        lRes = true; //every conjunct in V matches Q
        forall(x' in x.succ())
          lRes &= IsLink(x', y, px, py, M);
      }
  } else {                                       //Case 5
      if (y.isAnd()) {               //Case 5a: reg-AND
        recordMatch = false; //reg-AND match is not a LINK
        lRes = false; //some conjunct in Q matched by V
        forall(y' in y.succ())
          lRes |= IsLink(x, y', px, py, M);
      } else {                       //Case 5b: reg-reg
        if (x.axis.isDescendant()) {          //Case 5b1
          lRes = false; //some descendant must match
          forall(y' in y/PE(x)) {
            lRes2 = match(x, y', M);
            insertMatch(lRes2, x, y', px, py);
            lRes |= lRes2;
          }
          recordMatch = false; //do not record (x,y)
        } else lRes = Match(x, y, M);         //Case 5b2
      }
  }
  if (recordMatch) insertMatch(lRes, x, y, px, py);
  return lRes;
}
```

FIG. 13

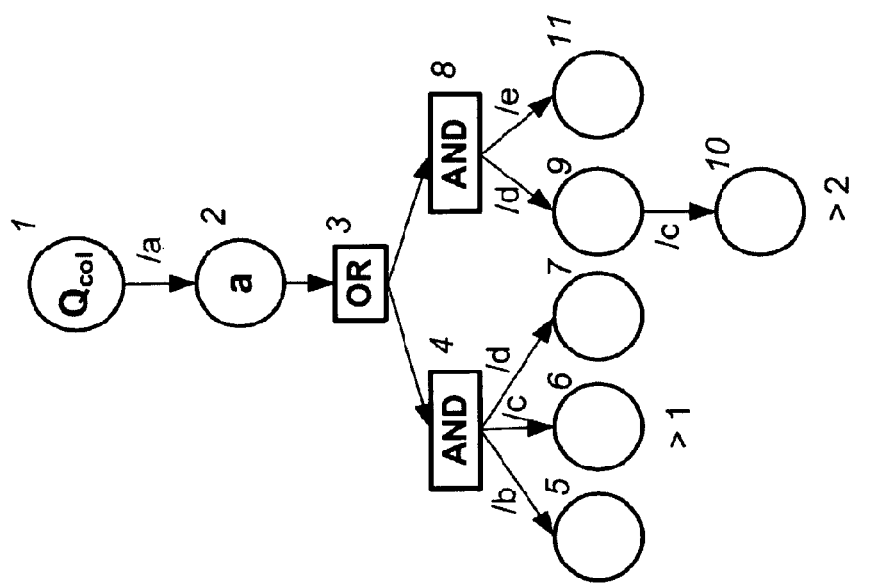
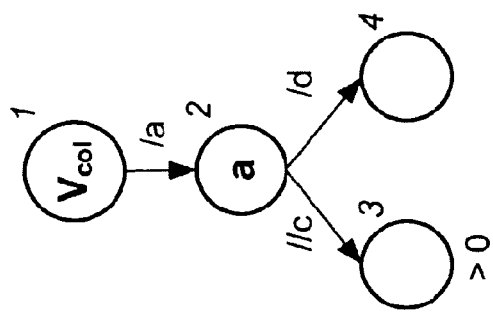
FIG. 14

```
CleanUp() {
do {
    change = false;
    forall (x,y,x',y') in LINKS
        if(!(exists(_,_,x,y) in LINKS)) {
            LINKS -= (x,y,x',y');
            change = true;
        }
} while (change)
}
```

FIG. 15

VIEW MATCHING OF MATERIALIZED XML VIEWS

BACKGROUND

SQL/XML has become the standard means to extend SQL to include XML data types and to query XML columns by XQuery. It is supported by most commercial relational database systems, while others, such as Microsoft® SQL Server, support a dialect called SQLXML.

A table in SQL Server may contain columns of type XML. A column of type XML may store XML documents, which can then be queried using XQuery. To speed up the processing of queries against an XML column, a special type of index called an XML index can be created on the column. To create the index, the documents are completely shredded, pulling out every node in the documents and including them in the index. This makes the index very large compared with the original size of the documents (on the order of 3-5 times larger).

Users often were dissatisfied with the size of an XML index because even when user are only interested in querying just parts of a document, the index includes everything in the document. It is well-known that in relational database systems judicious use of materialized views can speed up query processing by several orders of magnitude. In a relational database system that supports XML data, it is therefore important to extend the materialized view mechanisms to queries and views that also involve XML columns. To exploit materialized views, three problems need to be overcome. First, which views to materialize must be determined. Second, it has to be decided which views, if any, can be used to answer a query and how to rewrite the query to make use of the views. Finally, materialized views should be kept current in the presence of updates. In order to be able to query just a portion of the XML document and keep the index size manageable, the second problem (called the "view matching problem") should be addressed.

Previous work on the XML view matching problem has been very restrictive in the kinds of views that can be created or what can be included in a view. The reason is that there is no point in allowing views that are more complex than the given matching technique can handle.

Some existing techniques are dependent on knowledge of the actual data that is currently available. This is problematic, however, in relational database system if the data is changing over time. A match that was valid at one point in time may no longer be valid at a later time. This prevents the reuse of query plans, something which is standard practice in relational database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the materialized XML view matching system and method use view matching of materialized XML views to expedite processing of SQLXML queries. The view matching process of the embodiments of the materialized XML view matching system and method use a multi-path tree (MPT) data structure. The MPT data structure is capable of capturing the semantics of multiple XPath expressions occurring in an SQLXML expression. Moreover, embodiments of the materialized XML view matching system and method use a view matching technique that correctly handles expressions combining conjunctions, optional components, and arbitrary disjunctions. When a view is matchable, embodiments of the materialized XML view matching system and method also calculate residual predicates, continuations, and correctives. Together, these techniques form an entire query rewrite process.

Embodiments of the materialized XML view matching system and method are an improvement over existing techniques. Matching decisions do not depend on the actual data content at the time of matching. As long as the data satisfies schema constraints, then found matches and rewrites remain valid. Moreover, view matching is performed on both relational and XML expressions and such that XPath expressions are correctly matched with combinations of conjunctions and disjunctions as well as optional substructures. In addition, embodiments of the system and method define a more generic class of views having additional information, which is less restrictive that current techniques.

Embodiments of the materialized XML view matching system and method take as input a query expression (such as a SQL query) and a view expression. A MPT data structure then is constructed for each of these expressions. View matching then is performed on the MPT data structures and a set of partial matches is generated.

The set of partial matches is cleaned by identifying those that cannot be part of a valid match. These false partial matches then are removed, and a set of candidate matches is obtained. A candidate match is a valid match only if it satisfies a specific set of compliance conditions. Match extraction is performed on the set of candidate matches, in the process testing each candidate against the compliance conditions, and a set of valid matches is obtained. For each valid match, a substitute query expression is constructed that can serve as a replacement for the original query. These substitute query expressions can be used to evaluate the original query.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 9 illustrates an exemplary example of MPT fragments that represent a view and a query.

FIG. 11 illustrates an exemplary implementation of the MatchViewQuery function.

FIG. 12 illustrates an exemplary implementation of the Match function.

FIG. 13 illustrates an exemplary implementation of the routine IsLink( ).

FIG. 14 is an exemplary example of sample MPT's of a view expression and a query expression.

FIG. 15 illustrates an exemplary implementation of the CleanUp function.

DETAILED DESCRIPTION

In the following description of embodiments of the materialized XML view matching system and method reference is made to the accompanying drawings, which form a part thereof, and in which is shown by way of illustration a specific example whereby embodiments of the materialized XML view matching system and method may be practiced. It is to be understood that other embodiments may be utilized and structural changes may be made without departing from the scope of the claimed subject matter.

I. System Overview

Figure 1:
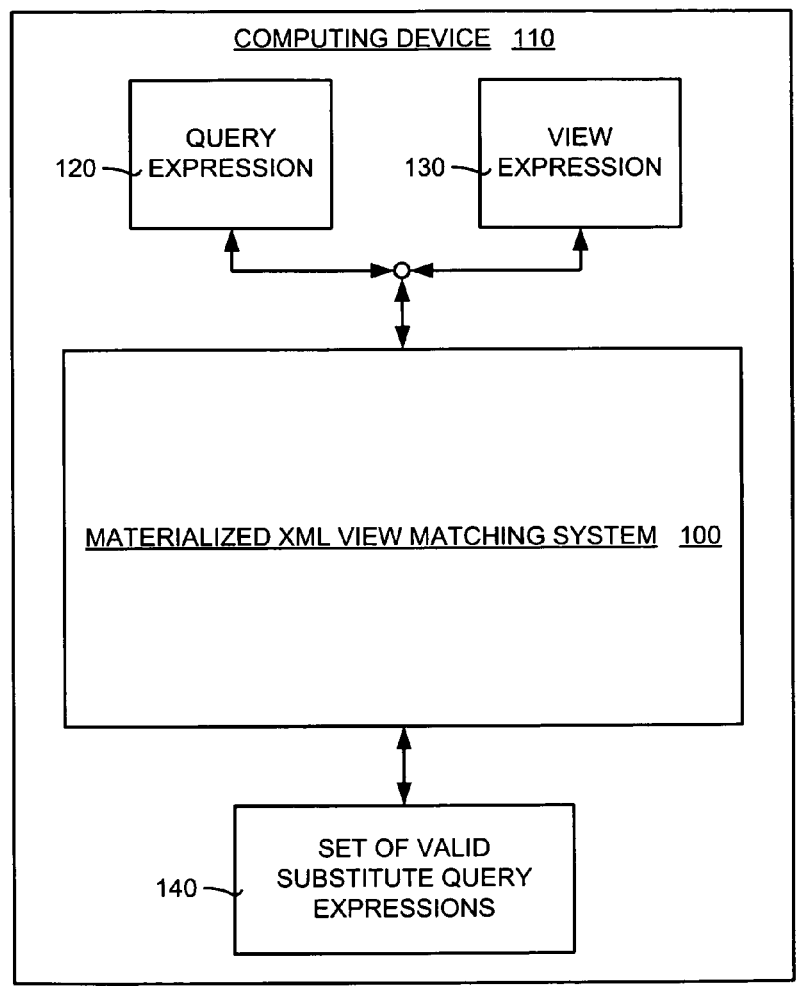
FIG. 1 is a block diagram illustrating a general overview of embodiments of the materialized XML view matching system and method disclosed herein

FIG. 1 is a block diagram illustrating a general overview of embodiments of the materialized XML view matching system and method disclosed herein. It should be noted that the implementation shown in FIG. 1 is only one of many implementations that are possible. Referring to FIG. 1, a materialized XML view matching system 100 is shown implemented on a computing device 110. It should be noted that the computing device 110 may include a single processor (such as a desktop or laptop computer) or several processors and computers connected to each other.

In general, embodiments of the materialized XML view matching system 100 inputs a query expression 120 and a view expression 130. Although only one of each is shown in FIG. 1, there may be more than one query expression 120, more than one view expression 130, or both. The query expression 120 and the view expression 130 are processed by embodiments of the materialized XML view matching system 100. The details of the materialized XML view matching system 100 are set forth below. Embodiments of the materialized XML view matching system 100 outputs a set of valid substitute query expression 140. These substitute query expressions can be used in place of the original query expression 120.

Figure 2:
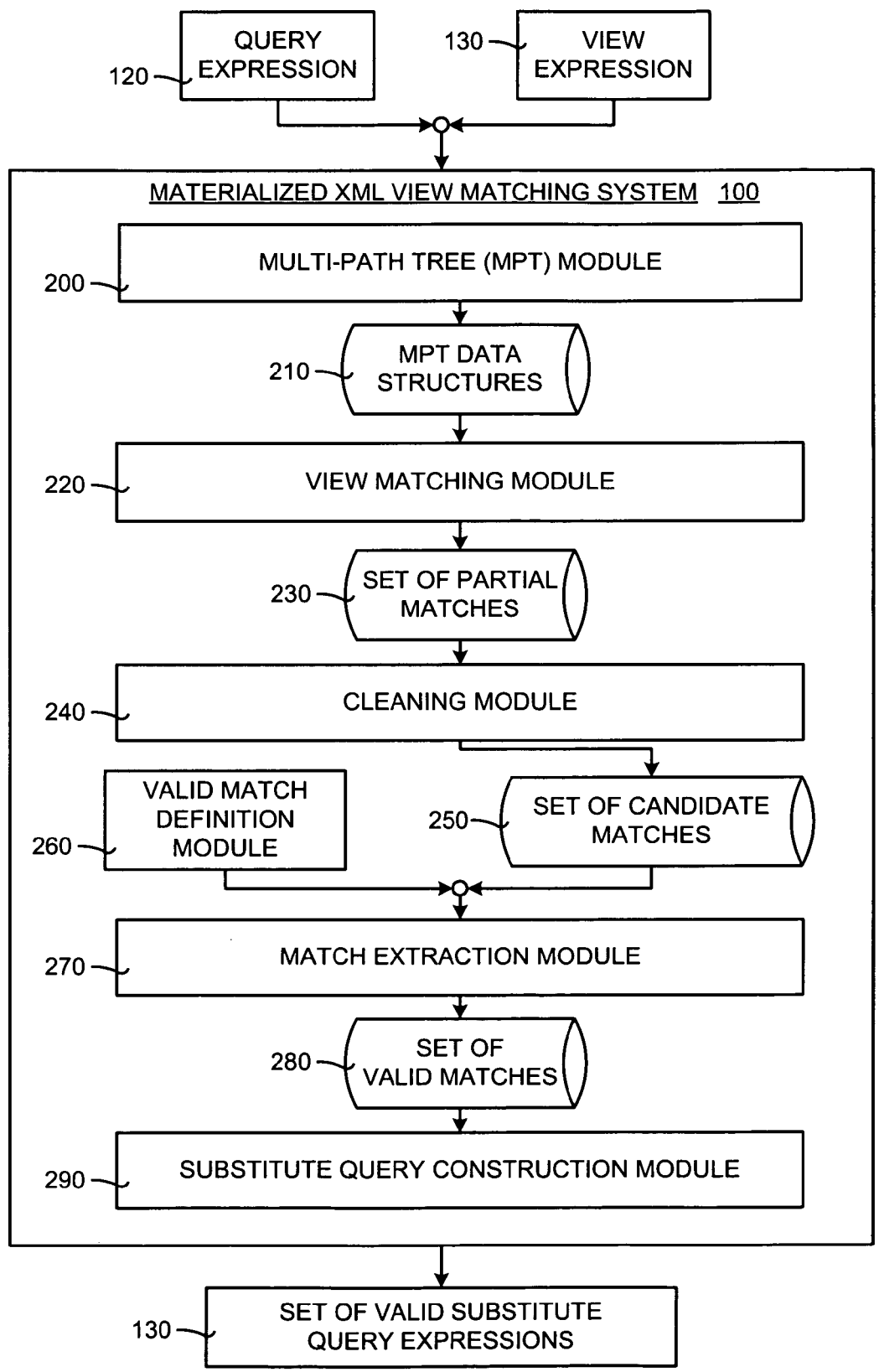
FIG. 2 is a block diagram illustrating details of embodiments of the materialized XML view matching system and method shown in FIG. 1.

Embodiments of the materialized XML view matching system 100 include a number of program modules. FIG. 2 is a block diagram illustrating details of embodiments of the materialized XML view matching system 100 and method shown in FIG. 1. In general, FIG. 2 illustrates the program modules utilized by embodiments of the materialized XML view matching system 100 to process the query expression 120 and the view expression 130 to generate the set of valid substitute query expressions.

As noted above, at least one query expression 120 and at least one view expression 130 are input to the materialized XML view matching system 100. Embodiments of the system 100 include a multi-path tree (MPT) module 200 that generates MPT data structures. The output of the MPT module 200 is MPT data structures 210 for each expression including the query expression 120 and the view expression 130. These MPT data structures 210 are input to a view matching module 220. The view matching module 220 processes the MPT data structure 210 and outputs a set of partial view matches 230.

Embodiments of the materialized XML view matching system 100 also includes a cleaning module 240. The set of partial matches 230 is processes by the cleaning module 240 to clean-up any unnecessary or unneeded partial matches. The output of the cleaning module 240 is a set of candidate matches 250.

Embodiments of the materialized XML view matching system 100 also include a valid match definition module 260 that sets forth a definition of a valid match. A match extraction module 270 uses information from the valid match information module 260 to process the set of candidate matches 250. The match extraction module 270 outputs a set of valid matches 280. A substitute query construction module 290 processes the set of valid matches 280 and outputs the set of valid substitute query expression 130.

II. Operational Overview

Figure 3:
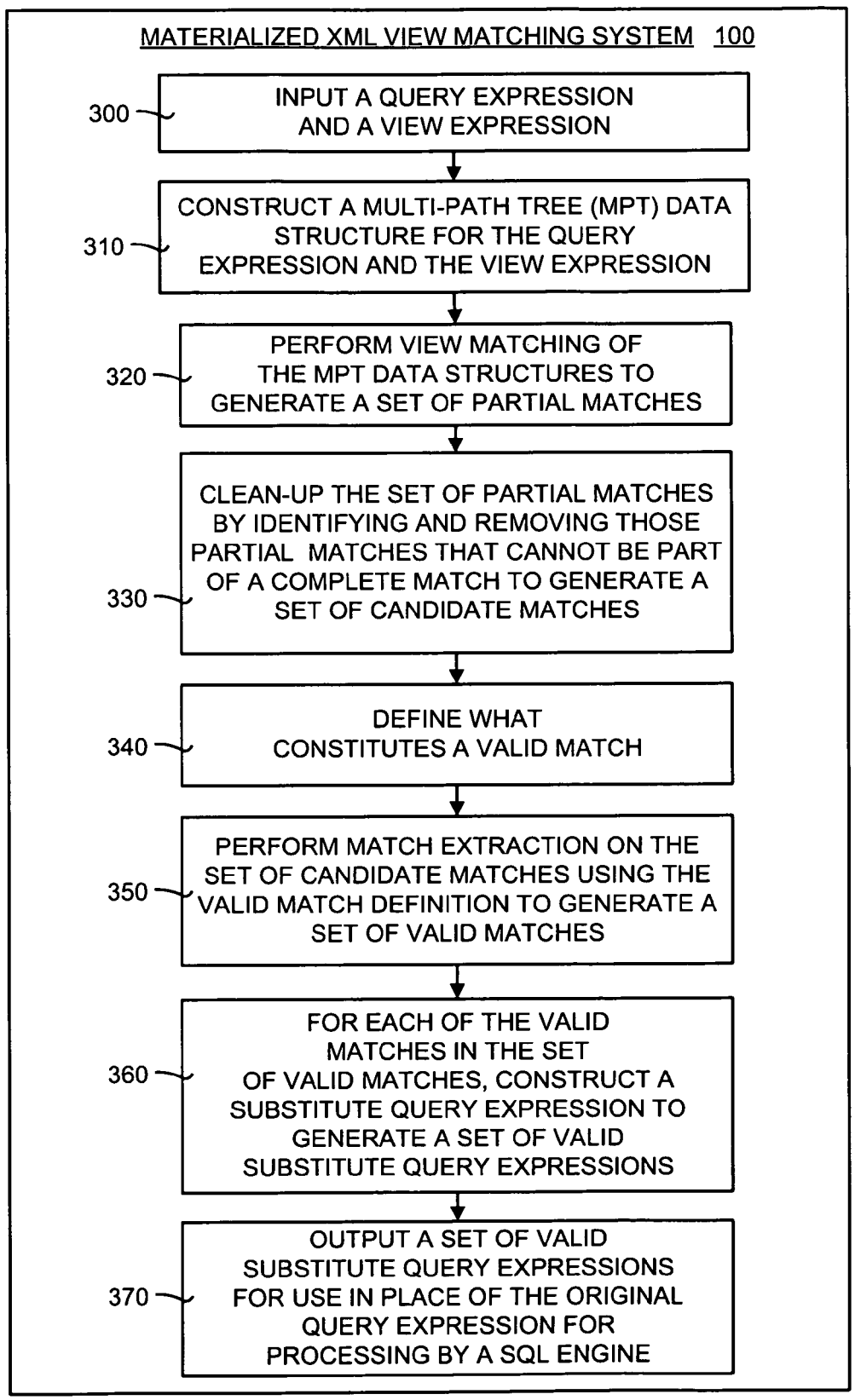
FIG. 3 is a flow diagram illustrating the operation of embodiments of the materialized XML view matching system and method shown in FIGS. 1 and 2.

FIG. 3 is a flow diagram illustrating the operation of embodiments of the materialized XML view matching system 100 and method shown in FIGS. 1 and 2. The method begins by inputting a query expression and a view expression (box 300). Next, a multi-path tree (MPT) data structure is constructed for both the query expression and the view expression (box 310). The details of the MPT data structure is described in further detail below.

The method then performs view matching of the MPT data structures to generate a set of partial matches (box 320). The set of partial matches then is cleaned by identifying and removing those partial matches that cannot be a part of a complete match (box 330). This generates a set of candidate matches, which are cleaned partial matches. The method then defines what constitutes a valid match (box 340).

Match extraction then is performed on the set of candidate matches using the definition of a valid match to generate a set of valid matches (box 350). For each of the valid matches in the set of valid matches, a substitute query expression is constructed (box 360). This generates a set of valid substitute query expressions that can be used in place of the original query expression. The output is the set of valid substitute query expressions for processing by a database management system (DBMS) engine, such as a SQL engine (box 370).

III. Operational Details

The operational details of embodiments of the materialized XML view matching system 100 and method now will be discussed. These embodiments include embodiments of the program modules shown in FIG. 2. The operational details of each of these programs modules now will be explained in detail.

III.A. SQLXML Views

The discussion of the operational details begins with a discussion of how to define SQLXML views. The SQLXML views can be exploited to answer SQLXML queries. A SQLXML materialized view can be defined using selection, projection, join, and group-by operators in the same way as any relational view, but with the additional feature that subcomponents of any XML column can also be defined in the FROM clause and projected using the SELECT clause. Property functions take as parameter an XQuery expression that is evaluated to extract XML element ids (ordpath), parts of XML documents (nodes), or values from within those parts (value). The value function takes an SQL type as its second parameter and casts the value into that type. Functions ordpath and value return single values, but nodes is a table-valued function that generates a single-column row for each node that the XQuery expression returns.

To incorporate the results of a table-valued function, embodiments of the system 100 and method use of the apply operator available in SQL Server by Microsoft®. The operator takes two operands, both of which are table-valued expressions or functions. Apply is similar to a nested loop join or repeated function call: for each row in the left input, the right operand is evaluated once, producing one or more rows. The right operand can reference columns from the left operand.

The apply operator takes two forms: cross apply and outer apply. If the function used as right operand returns at least one row, both forms output all returned rows extended with the values from the row of its left operand. If the result from the right operand is empty, cross apply outputs nothing whereas outer apply outputs one row consisting of the row value of the left operand padded with NULL values in all columns of the right operand. Thus cross apply and outer apply are similar to inner join and left outer join, respectively, providing the ability to manage optional substructures.

When defining SQLXML materialized views, embodiments of the system 100 and method restrict references to subcomponents of an XML data field to the FROM and SELECT clauses. The grammar for the SQLXML materialized views is as follows:

```
View      := Create Select From Where Groupby
Create    := create materialized view VName as
Select    := select Selector (, Selector)*
Selector  := Column | Node | Value
Column    := SQL-expr
Node      := CName .ordpath( ) as CName
Value     := CName .value('.',' conversion ') as CName
             | CName .query('.') as CName
             | CName .exist('.') as CName
From      := from SQL-expr (CApply j OApply)*
CApply    := cross apply Extract
OApply    := outer apply Extract
Extract   := CName .nodes(' XPath ') as TName ( CName )
Where     := where SQL-expr
Groupby   := groupby SQL-column-list
```

References to subcomponents of an XML data field are restricted to the FROM and SELECT clauses so that the embodiments of the system 100 and method are able to capture the complete semantics of the view for matching, as described in detail below. In addition, embodiments of the system 100 and method also restrict XPath expressions to those involving predicates and the following axes: self, child, descendant-or-self, and attribute. Embodiments of the system 100 and method also restrict comparisons in XPath expressions to compare node values to constants. Queries are not similarly constrained, but instead it is attempted to extract an appropriate "information need" from the XQuery expression. In this manner, embodiments of the system 100 and method might not recognize a valid match, but will never generate an invalid match.

Consider now the following simple example query:

```
select T.key as year,
       course.value('@cnum', 'int') as cid
    from T cross apply doc.nodes('
        for $i in cal/courses/course
        where $i/subject = "CS" or
            ($i/*/meetings/hours < 3
            and $i/*/meetings/lab = "req")
        return $i
    ') as x1(course)
    where key > 2005
```

For each qualified doc, the query result includes a row reporting each qualifying cnum attribute associated with the primary key of the table reflecting the calendar's year. Embodiments of the system 100 and method determine whether the data captured by the materialized view can be used to answer such a query.

III.B. Multi-Path Tree (MPT) Module

The multi-path tree (MPT) module 200 inputs query expressions and view expressions and generates MPT data structures for each of these expressions. Embodiments of the module 200 capture the semantics of multiple XPath expressions in an SQLXML expression using the Multi-Path Trees. These MPTs play the same role as tree patterns and XPS trees currently in use, but also include additional information to increase their expressivity. In particular, an MPT can model disjunction, conjunction, optionality, and simple restrictions on arbitrarily many XPath expressions derived from an XML column. It should be noted that throughout this document V is used for a view and Q is used for a query.

III.B.1. MPT Core

Figure 4:
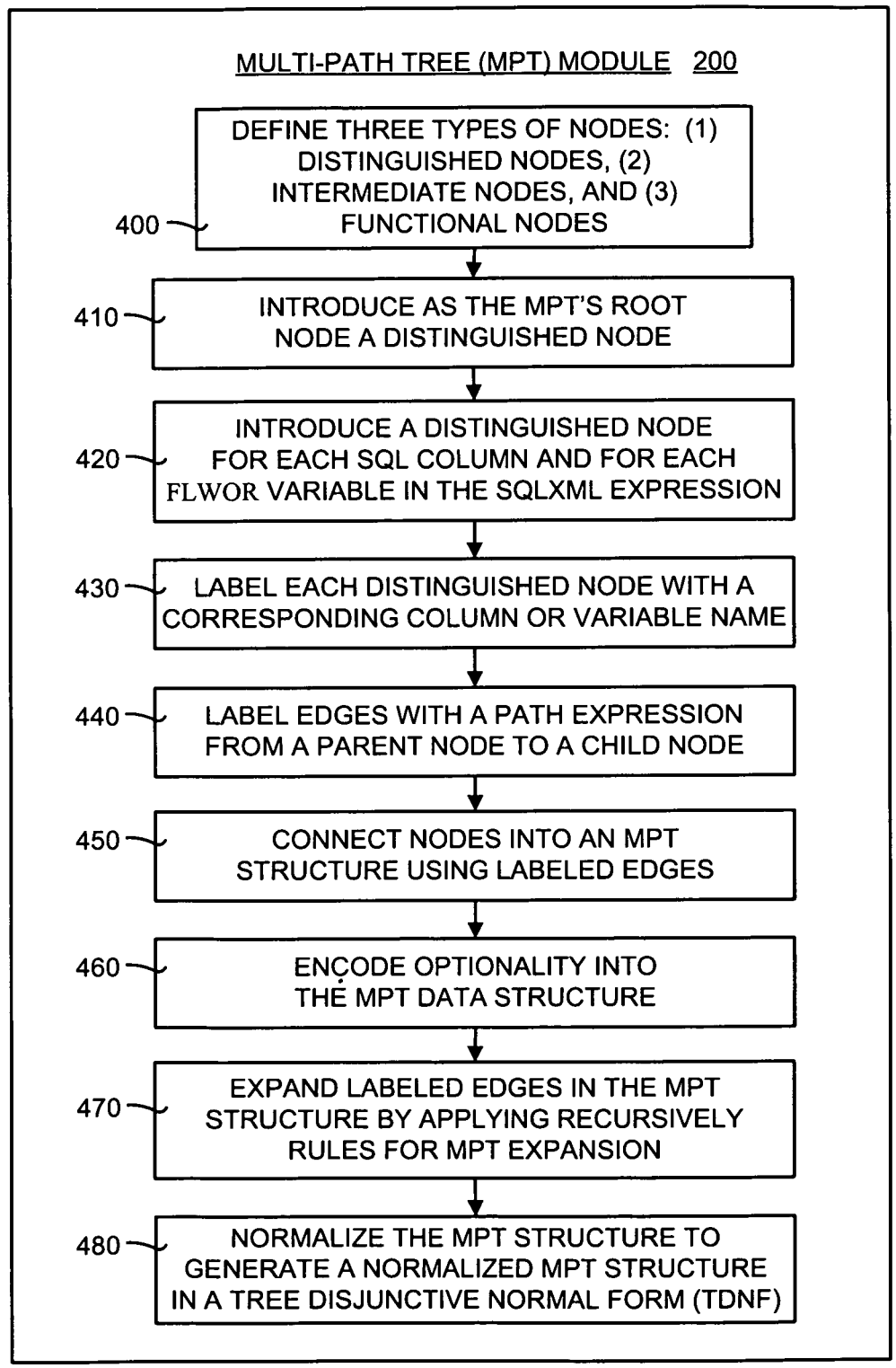
FIG. 4 is a flow diagram illustrating the operation of embodiments of the MPT module shown in FIG. 2.

FIG. 4 is a flow diagram illustrating the operation of embodiments of the MPT module 200 shown in FIG. 2. A Multi-Path Tree (MPT) is an unordered, directed, singly-rooted tree. As shown in FIG. 4, the first step is to define three kinds of nodes for the MPT structure: distinguished nodes, intermediate nodes, and functional nodes (box 400). A distinguished node identifies a named component (which may be filtered by various expressions to define the query and the view) or a component that is projected by the view. Thus a distinguished node corresponds to a column in the FROM clause of the query or view definition or to a variable name in a query's FLWOR expression, or it is a projected node in a view definition. Intermediate nodes are introduced after the initial construction of an MPT, and they represent unnamed components. Functional nodes are similarly introduced and represent Boolean connectors or nil. Embodiments of the module 200 use isDist to test whether a node is distinguished, and such a node is labeled by its corresponding column or variable name. Moreover, isFunc is used to test whether a node is a functional node.

An edge is labeled with the path expression indicating the path from the parent node to the child node. During construction of an MPT, an edge label can be an arbitrary path expression, which is possibly preceded by a question mark to indicate optionality. Upon completion, however, only a simple step (axis plus node test) can appear as an edge label. Edges terminating at a functional node must be unlabelled. It should be noted that PE(a, b) is used to refer to the label on edge (a, b).

Mathematically, let $x_0, \ldots, x_k$ be successive nodes on a directed path in an MPT, none of which are functional nodes. Moreover, let the connecting edges be labeled $e_0, \ldots, e_k$, respectively. This directed path represents the XPath $e_1/\ldots/e_k$ plus the set of XPaths $e_{12}/\ldots/e_d[e_{d|1}/\ldots/e_k$ for each distinguished node $x_d, d>0$. If a (sub)tree is rooted by an or node, disjunctive semantics are applied to all its sub-trees. Otherwise conjunctive semantics are applied. A nil node matches any XPath expression (including the empty one).

III.B.2. MPT Construction

Given an SQLXML expression representing a view or a query, embodiments of the MPT module 200 construct its MPT as follows. Referring again to FIG. 4, embodiments of the module 200 introduce as the MPT's root a distinguished node labeled by the fully qualified relational XML column name (box 410). Next, a distinguished node is introduced for each SQL column and for each FLWOR variable named in the SQLXML expression (box 420). The distinguished node is labeled with the corresponding column or variable name (box 430).

The MPT labels edges with a path expression from a parent node to a child node (box 440). The MPT initially connects these nodes into a tree using labeled edges as follows (box 450):

1. For each FROM clause entry cross apply x.nodes('P') as T(y), insert an edge (x,y) with PE(x,y)=P.
2. For each FROM clause entry outer apply x.nodes('P') as T(y), insert an edge (x,y) with PE(x,y)=?P.

For view definitions, embodiments of the module 200 also include the following edges:

3. For each SELECT clause entry x.$f$('P') as y with property function $f$, insert an edge (x,y) with PE(x,y)=?P.

Note the inclusion of the optionality marker (?), since these expressions return the empty sequence when no match is found.

Embodiments of the module 200 adopt a restricted view grammar so that MPT construction is straightforward for views. However, since path expressions can occur deeply nested in a FLWOR expression, describing the extraction process for such expressions in queries can be quite lengthy. The following lemma holds for MPTs constructed from views:

Lemma 1: An initially constructed MPT captures exactly the XPath information expressed in a view defined by the grammar given above.

III.B.2.a. Encoding Optionality

Given an initial MPT, embodiments of the module 200 first transform optionality markers embedded in edge labels into structural components (box 460). This is achieved as follows. For each edge (x,y) having label P(x, y)=?$P_1$, an or node u and a nil node v are introduced. Next, edge (x,y) is deleted, edges (x,u) and (u,v) are inserted with no labels. Moreover, edge (u,y) is inserted with label $P_1$. As a result, every optional node becomes a child of an or node that has a nil node as a second child.

III.B.2.b. Recursive MPT Expansion

After encoding optionality, edge labels are still XPath expressions involving multi-step paths with nested predicates. Embodiments of the module 200 expand edges in the MPT by applying the following rules recursively, such that each application simplifies the label on some edge (box 470).

For each edge (x,y) having one or more predicates, embodiments of the module 200 remove the predicates from its label and attach corresponding sub-trees to y for each predicate. In particular, given PE(x,y)=$P_1[P_2]$, the label is changed on (x,y) to be $P_1$, an intermediate node z is introduced, and edge (y,z) with label $P_2$ is inserted.

Embodiments of the module 200 also expand edges labeled by multi-step XPath expressions into paths composed of additional intermediate nodes and simpler edges. An edge labeled by an XPath expression consisting of several location steps is expanded into a sequence of edges, whereby each is labeled by a single step expression. Formally, for each edge (x,y) with PE(x,y)=$l_0/ \ldots /l_{k+1}$, edge (x,y) is deleted and intermediate nodes $z_1, \ldots, z_k$ are added as well as the following edges: $(x,z_1)$ with PE(x,$z_1$)=$l_0$, $(z_i, z_{i+1})$ with PE($z_i$, $z_{i+1}$)=$l_i$ for $0<i<k$, and ($z_k$,y) with PE($z_k$,y)=$l_{k+1}$.

Embodiments of the module 200 then simplify all edge labels that represent Boolean expressions by introducing Boolean operator trees. By construction, edges with such labels can only result from expanding predicates. This means they can only appear on sub-trees of the MPT and must end at an intermediate node. In particular, if an edge (x,y) has label PE(x,y)=$P_1$ or $P_2$, then the edge is deleted, an or node u and an intermediate node z are introduced, an unlabelled edge from x to u is inserted, and two additional edges are inserted: from u to y with label $P_1$ and from u to z with label $P_2$. Similar processing can be applied to conjunctive expressions.

To handle predicates involving comparisons, embodiments of the module 200 annotate the corresponding nodes of the MPT with the comparisons. These annotations are called restrictions, in order not to confuse them with XPath predicates.

The recursive nature of XPath expressions results in the recursive application of these rules (handling multiple steps and predicates). The procedure terminates when all edges labels reflect simple axis-node-test steps with no predicates. Embodiments of the module 200 satisfy the following two lemmas:

Lemma 2: Recursive MPT expansion is a finite Church-Rosser replacement system.

Lemma 3: An MPT resulting from encoding optionality and recursive MPT expansion encodes the same semantics as its input MPT.

III.B.2.c. MPT Normalization

To avoid matching being influenced by mere syntactic differences, embodiments of the module 200 transform both the view expressions and the query expressions into normal form in a tree disjunctive normal form (TDNF) (box 480). XML attributes are treated as if they were simple children by changing the attribute axis to a child axis in the MPT. Embodiments of the module 200 also combine successive or nodes into a single disjunction and successive and nodes into a single conjunction, and the nodes linked by the self axis then are merged.

In the relational context, normalization often involves converting Boolean expressions into conjunctive normal form. However, this is not appropriate in the XML context because it is not possible to move conjunctions up or down a path. For example, expressions a[b/c and b/d] and a[b[c and d]] are not equivalent, because a[b[c and d]] requires that both the c node and the d node have the same b node as parent, whereas a[b/c and b/d] does not require that they have the same parent. However, expressions a[b/c or b/d] and a[b[c or d]] are equivalent. This means that embodiments of the module 200 can push disjunctions down over common prefixes on paths during normalization.

A location step, such as a[b][c], involving multiple predicates is equivalent to having a single conjunctive predicate, that is a[b and c] for this example. As part of normalization embodiments of the module 200 may pull disjunctions up with respect to explicit and implicit conjunctions. Finally, embodiments of the module 200 remove nil conjuncts, collapse multiple nil disjuncts into a single one, and restrict and nodes to appear only as the root of a disjunct and only when more than one conjunct is present in that disjunct.

The normalization process of embodiments of the module 200 thus involves six transformations: (1) changing occurrences of the attribute axis to the child axis; (2) combining successive and nodes, or nodes, and nodes linked by the self axis; (3) pushing or nodes down over common prefixes; (4) pulling or nodes up whenever they have a sibling node; (5) removing nil nodes occurring in conjunctions or with other nil nodes in disjunctions; and (6) ensuring that and nodes appear only under or nodes and only when there are multiple conjuncts. The resulting normal form is called a tree disjunctive normal form (TDNF).

Figure 5:
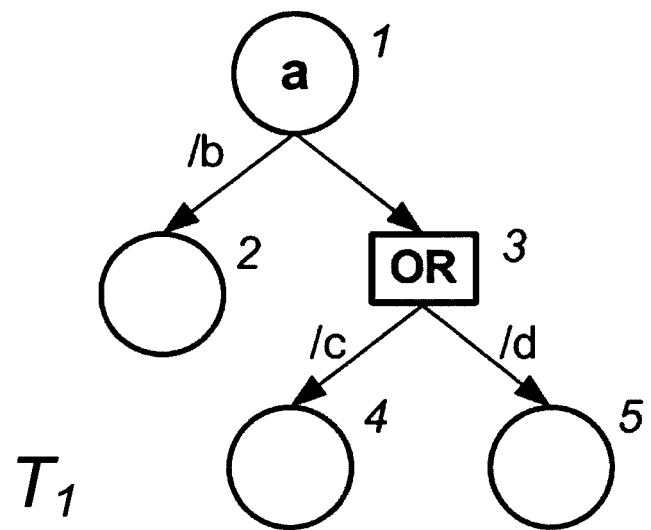
FIG. 5 is a first example that illustrates a first MPT fragment, $T_1$, which is comparable to $T_2$ in FIG. 6.
Figure 6:
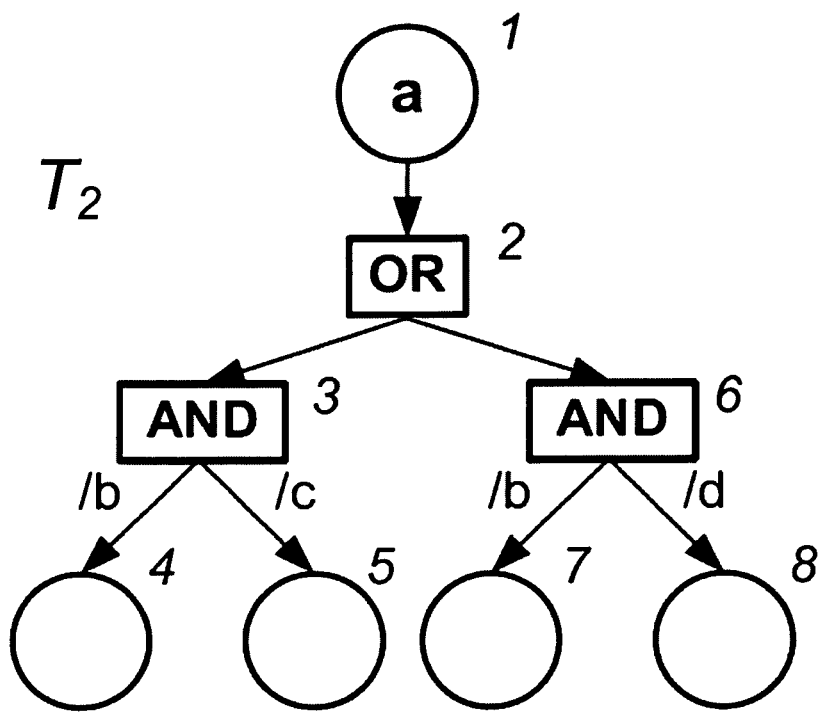
FIG. 6 is a second example that illustrates a second MPT fragment, $T_2$, which is comparable to $T_1$ in FIG. 5.
Figure 7:
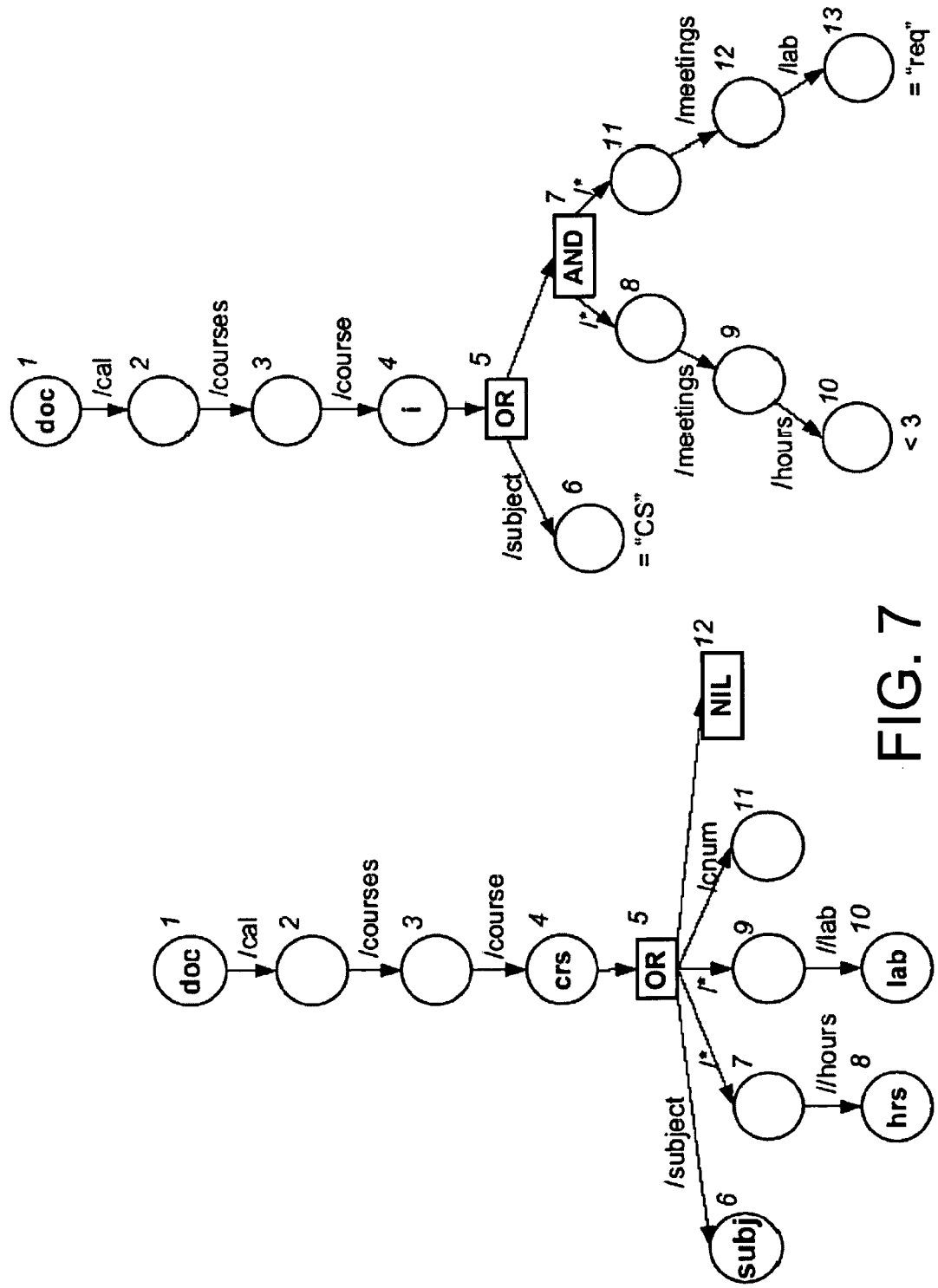
FIG. 7 illustrates an example of normalized MPTs for a query expression and a view expression.

FIGS. 5 and 6 illustrate two comparable MPT fragments, namely $T_1$ and $T_2$. In particular, FIG. 5 is a first example that illustrates a first MPT fragment, $T_1$, which is comparable to $T_2$ in FIG. 6. FIG. 6 is a second example that illustrates a second MPT fragment, $T_2$, which is comparable to $T_1$ in FIG. 5. Moreover, as shown in FIGS. 5 and 6, $T_2$ is the TDNF of $T_1$. FIG. 7 illustrates an example of normalized MPTs for a query expression and a view expression. In FIG. 7, distinguished and intermediate nodes are shown as single circles, the former being those with labels, and functional nodes are enclosed by rectangles. For explanatory purposes, a preorder numbering is used to identify nodes in the MPT.

Embodiments of the module 200 satisfy the following lemma and theorem:

Lemma 4: MPT normalization is a finite Church-Rosser replacement system.

Theorem 1: Normalized MPTs are equally as expressive for representing a collection of XPath expressions as is the view language described in FIG. 1, and their construction preserves the semantics of a view.

III.B.3. Additional Notation

Embodiments of the module 200 use the notation NODES (E) for the set of all nodes in the MPT for expression E, whether E represents a query or a view definition. For $x \in$ NODES(E), embodiments of the module 200 denote its (immediate) successors in the MPT by succ(x), that is, succ(x)={$y \in$ NODES(E)|(x,y) is an edge in E}.

Let PE(x, y) be the axis-node-test label of the edge ending at node y. For convenience, embodiments of the module 200 define PE(y)=PE(x,y), AX(y) to be its axis, and NT(y) to be its node-test. Given a node w and another node z, possibly from another MPT, if AX(z)='/' it is denoted by w=PE(z) the children of w that match NT(z). Similarly, if AX(z)='//', then it is denoted by w=PE(z) the singleton set {w} if w matches NT(z) union all descendants of w that match NT(z) minus all descendants of any or node that is itself a descendant of w. Thus, in the latter case, w=PE(z) may include w and some of its descendants, but it does not look beyond any or nodes.

III.C. Valid Match Definition Module

The valid match definition module 260 defines what constitutes a valid match. A core component of the module 260 is to find a valid mapping from the view's MPT nodes to the query's MPT nodes. If such a mapping exists, embodiments of the module 260 construct the query substitute based on it. In this section, the MPT matching problem is set forth and the notion of valid match is defined.

In order to find a valid match from a view to a query, homomorphisms are typically considered. However, there can be exponentially many homomorphisms between two MPTs. Instead of computing them one after the other, embodiments of the module 260 calculate a cover in polynomial time. From the cover, embodiments of the module 260 subsequently extract all valid matches and generate query substitutes from them.

Another deviation from the traditional homomorphism approach is that optional components and disjunctions force the consideration of partial mappings whereas homomorphisms are total mappings. The mapping must adhere to the logic of the MPTs for the query and the view, but the mapping can be partial, and it also need not be surjective.

III.C.1. Link Sets and Matches

The match cover used by embodiments of the module 260 is a set of links representing all possible homomorphisms using quadratic space in the worst case. Denote the space NODES(V)×NODES(Q)×NODES(V)×NODES(Q) by $H_{V,Q}$. A link is defined to be a quadruple of nodes (v,q,v',q') $\in H_{V,Q}$ representing the possibility to map a view node v to a query node q under the condition that a second view node v' is mapped to a second query node q'.

Henceforth, let H be a link set, that is, $$H \subseteq H_{V,Q}$$

Because a link set H is a cover for a collection of node mappings, the properties of subsets of H are of particular interest. Any, $$h \subseteq H$$

is called a match (although not necessarily a valid one), and, h(x) is defined as:

$$h(x) = \{y \oplus \exists x_p, \exists y_p, (x,y,x_p,y_p) \in h\}.$$

III.C.2. Conditions for Valid Matches

The conditions for valid matches includes a definition of logic compliance and the definition of root compliance. This algorithm is part of tree matching in order that embodiments of the module 260 can be embedded in a general relational view matching procedure.

III.C.2.a. Root Compliance

Figure 8:
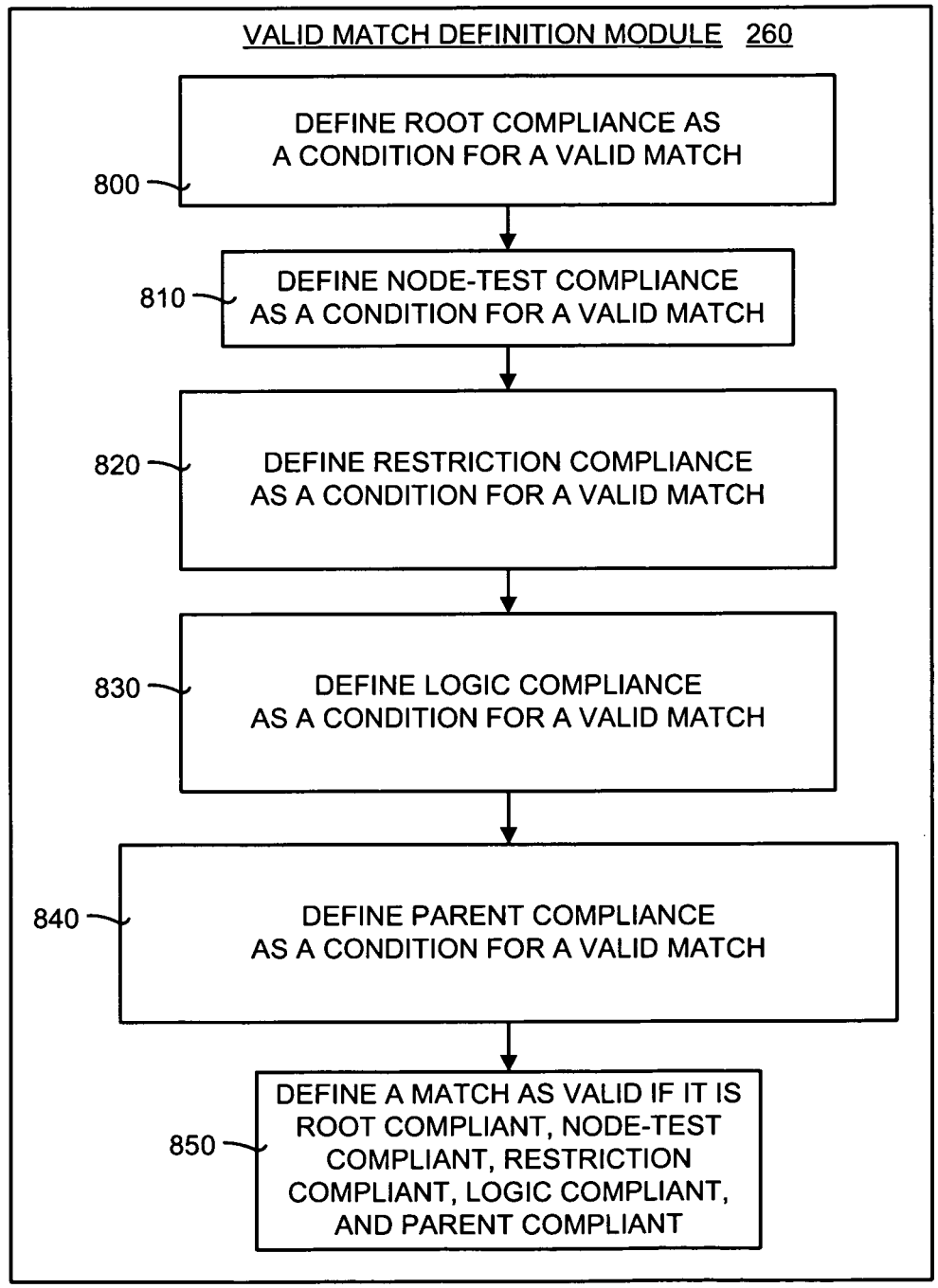
FIG. 8 is a flow diagram illustrating the operation of embodiments of the valid match definition module shown in FIG. 2.

FIG. 8 is a flow diagram illustrating the operation of embodiments of the valid match definition module 260 shown in FIG. 2. The process begins by defining root compliance as a condition for a valid match (box 800). The first condition deals with relational view matching and is based on the fact that the root node of an MPT represents the base table column containing XML. Embodiments of the module 260 use a relational view matching algorithm having the following condition:

Condition 1: Let H be a link set and let $h \subset H$ be a match. Further, let $k_1, \ldots, k_n$ be the key attributes of the query and the view and assume both project on their keys. (If this is not the case, then modify them accordingly.) Call h root compliant if and only if h maps the root of V to the singleton set containing only the root of Q and for any database DB, $$\Pi_{k_1,\ldots,k_n}(V(DB)) \supseteq \Pi_{k_1,\ldots,k_n}(Q(DB)).$$

III.C.2.b. Node-Test Compliance

Referring again to FIG. 8, embodiments of the module 260 define node-test compliance as a condition for a valid match (box 810). A second condition is that matched nodes must have compatible node tests. To perform these tests, node tests are organized in a lattice. The top element is node( ) and the bottom element is a new node test fail( ), which fails for every node. It can be said that x covers y and write, $$x \sqsupseteq y,$$

if the node test x evaluates to true whenever the node test y evaluates to true. Let n serve as a namespace and a as an element name. Then, for example, $$* \sqsupseteq *:a \sqsupseteq n:a$$

and $$* \sqsupseteq n:* \sqsupseteq n:a$$

but neither $$*:a \sqsupseteq n:* \text{nor } n:* \sqsupseteq *a.$$

Embodiments of the module 260 have the following condition:

Condition 2: Let H be a link set and, $h \subseteq H$ be a match. h is called node-test compliant if $$\forall (x,y,x_p,y_p) \in h, \text{is Func}(x)$$

$$\lor \text{is Func}(y) \lor NT(X) \sqsupseteq NT(y).$$

III.C.2.c. Restriction Compliance

Referring again to FIG. 8, embodiments of the module 260 define restriction compliance as a condition for a valid match (box 820). Nodes in the MPT may be adorned by restrictions, which are Boolean expressions of simple predicates such as comparisons. Any match must obey these restrictions. Let Restrict(x) denote the restriction on node x, which is assumed to be true when there is no restriction specified. Embodiments of the module 260 use the following condition:

Condition 3: Let H be a link set and $h \subseteq H$ be a match. H is called restriction compliant if, if $\forall (x,y,x_p,y_p) \in h$, is Func(x)

$$\lor \text{is Func}(y) \lor (\text{Restrict}(y)) \Longrightarrow \text{Restrict}(x).$$

III.C.2.d. Logic Compliance

Referring to FIG. 8, embodiments of the module 260 define logic compliance as a condition for a valid match (box 830). Matching Boolean expressions is surprisingly complex. Embodiments of the module 260 correct problems with matching of Boolean expressions in existing work. Some existing matching algorithms also consider logic compliance but have flaws. First of all, many do not normalize their trees, so that the view a[b][c or d] does not match the query a[(b and c) or (b and d)]. Furthermore, consider the view a[b or c] and the identical query a[b or c]. Despite the query and view being identical, these existing algorithms fail, since they require one of the disjuncts in a view to match the complete query, which is overly restrictive.

Figure 10:
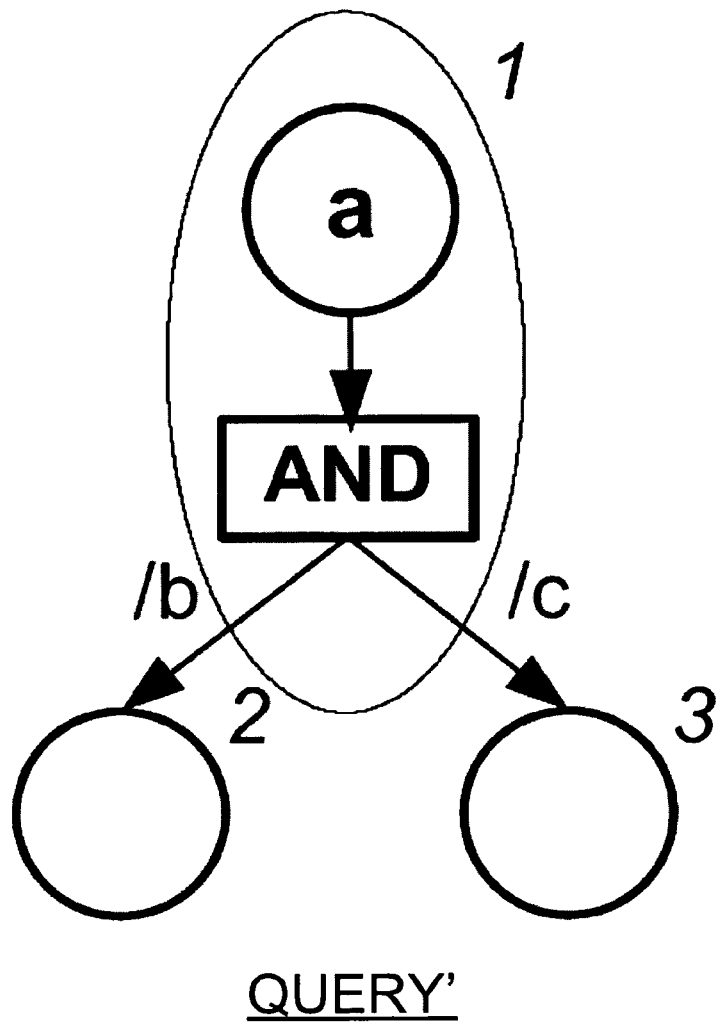
FIG. 10 is an example of mapping the view of FIG. 9 into the virtual and node implicitly associated with the query node of FIG. 9.

It will now be discussed how an or node should be matched against a regular node. FIG. 9 Illustrates an exemplary example of MPT fragments that represent a view (on the left side of the figure) and a query (on the right side of the figure). In order to match view node 1 to query node 1, embodiments of the module 260 need to map the or node to something from which the leaves in the view can be mapped to the leaves in the query. One approach is to map it to the virtual and node implicitly associated with query node 1 to treat its children as conjuncts. FIG. 10 is an example of mapping the view of FIG. 9 into the virtual and node implicitly associated with the query node of FIG. 9. Thereafter, each disjunct can be mapped as required.

With these points in mind, logic compliance can now be defined. It should be noted that all queries and views are in TDNF, so that and nodes can occur only under or nodes and or nodes cannot have siblings. Embodiments of the module 260 use the following condition for logic compliance:

Condition 4: Let H be a link set and $h \subseteq H$ be a match. H is called logic compliant if, $$\forall (x,y,x_p,y_p) \in h,$$

the following constraints hold:
1. If x and y are both or nodes, then, $$\forall y' \in \text{succ}(y), (x,y',x,y) \in h$$

2. If x is an or node and y is not an or node, then one of the following two conditions is true:
    (a) y' is the only successor for y and y' is an or node and (x, y', x, y)∈h
    (b) $\exists x' \in \text{succ}(x), (x', y, x, y) \in h$ 3. If y is an or node and x is not an or node, then both of the following two conditions are true:
    (a) x is not an and node (because of TDNF)
    (b) $\forall y' \in \text{succ}(y).$ $$(x,y',x,y) \in h \lor \exists y'' \in y'/PE(x), (x,y'', x,y) \in h.$$

4. If neither x nor y are or nodes, then $$\forall x' \in \text{succ}(x) \exists y', (x', y', x, y) \in h.$$

III.C.2.e. Parent Compliance

Referring again to FIG. 8, embodiments of the module 260 define parent compliance as a condition for a valid match (box 840). The embodiments of the module 260 also use the final condition:

Condition 5: Let H be a link set and $h \subseteq H$ be a match. h is called parent compliant if $$\forall (x,y,x_p,y_p) \in h$$

where $x_p$ and $y_p$ are not the MPT roots, $$\exists x \exists y', (x_p, y_p, x', y') \in h.$$

III.C.2.f. Match Validity and Covers

Referring again to FIG. 8, embodiments of the module 260 define a match as valid if it is root compliant, node-test compliant, restriction compliant, logic compliant, and parent compliant (box 850). Formally, each of the above conditions is aggregated using the following definition:

Definition 1: Let H be a link set and h be a match. The partial mapping h is a valid match if it is root compliant, node-test compliant, restriction compliant, logic compliant, and parent compliant.

The following definition introduces minimal covers, which are link sets that contain only those links necessary for valid matches.

Definition 2: Given a link set H, H is a cover for (V,Q) if for all valid matches, $$h \subseteq H_{V,Q}, h \subseteq H,$$

A cover H is a minimal cover if no proper subset of H is a cover.

Clearly, $H_{V,Q}$ itself is a cover. Although this set contains only $|NODES(V)|^2 |NODES(Q)|^2$ links, it may represent exponentially many valid matches.

III.C.3. Roadmap

A query substitute for a query Q is a query where at least one base table occurrence is replaced by the name of a materialized view. Other changes ("compensations") may be applied as well.

Definition 3: Given a query Q, a query substitute $Q_s$ is valid if for any database DB, $Q_s(DB)=Q(DB)$.

Here are the steps to find query substitutes for XML:
1. Call a function MatchViewQuery, passing the normalized MPTs for the view and the query. This first produces a link set $H_M$, which is a (small) cover for (V,Q). FIG. 11 illustrates an exemplary implementation of the MatchViewQuery function.
2. Before returning from MatchViewQuery, call a function Cleanup on $H_M$. This produces a link set, $$H_C \subseteq H_M,$$

where $H_C$ is a minimal cover for (V,Q).

3. Extract all valid matches from $H_C$ and construct corresponding query substitutes $Q_s$, all of which will be valid.

The embodiments of the module 260 also use the following lemma:

Lemma 5: Assume MatchViewQuery produces the link set $H_M$ before the call to Cleanup. For every link, $$(x,y,x_p,y_p) \in H_M,$$

there is a linkset, $$h \subseteq H_M,$$

such that, $$(x,y,x_p,y_p) \in h$$

and h is node-test compliant, restriction compliant, and logic compliant.

Thus, links in $H_M$ pair nodes x and y only when the sub-tree rooted at x in V matches the sub-tree rooted at y in Q. Although $|H_M|$ may be, $$\Omega(|NODES(V)|^2|NODES(Q)|^2)$$

even when $H_C$ is empty, it will often be only slightly larger than $|H_C|$.

III.D. View Matching Module

The view matching module 220 inputs the MPT data structures and outputs a set of candidate matches. The task of embodiments of the view matching module 220 is to calculate a minimal cover, checking all the conditions summarized in Definition 1. The MatchViewQuery first checks root compliance and then calls other routines to form a covering link set. Node-test and restriction compliance are checked by Match. Logic compliance is checked by IsLink, which is called from Match, and parent compliance will be enforced afterwards, during cleanup, by deleting links that are not part of valid matches.

After checking root compliance, the function Match-ViewQuery calls the function Match, which passes the roots of the two MPTs, which are to be treated as if they were simply and nodes. In order to avoid repeated calculations, a Boolean matrix M(x,y) caches whether a view node x can be mapped to a query node y. It is initially undefined on all inputs. The function Function Cleanup will be described below.

FIG. 12 illustrates an exemplary implementation of the Match function. The function Match checks the two compliances that depend on the pair of nodes only: (1) do the node types and node names match; and, (2) do the query restrictions imply the view restrictions? If these two tests succeed, Match then tests each successor in the view to determine whether it can be matched to some successor of the query node (Condition 4.4), repeatedly calling IsLink. It also treats the case where the child x' of the view node x is an or node, by treating y as an and node to try to match the or. Consider again FIG. 9 and a call Match($v_1, q_1$), where $v_i$ represents the view node 1 and $q_1$ represents the query node 1 (the right-side MPT fragment of FIG. 9). The only child node for $v_1$ is the or node, which is bound to $x_0$ by the outer for all loop, and the IsLink call (marked with *) is eventually invoked to compare it to $q_1$, but treating $q_1$ as and.

FIG. 13 illustrates an exemplary implementation of the routine IsLink( ). The routine IsLink( ) with four parameters (x,y,x',y') checks whether x can be mapped to y under the condition that x' has been mapped to y'. That is, it checks whether (x,y,x',y') is potentially part of a valid match. If all tests succeed, a link for (x,y,x',y') is normally recorded by calling insertMatch, which also updates M. If any test fails, x cannot be mapped to y, in which case insertMatch updates M only and does not record a link. To make query substitution more efficient, insertMatch also records whether query node y can be mapped to query node x, using the same techniques.

To examine the body of IsLink, an example first is traced, where the view and query trees are given in FIG. 14. In particular, FIG. 14 is an exemplary example of sample MPT's of a view expression and a query expression. Assume MatchViewQuery's test for root compliance succeeds when comparing $V_{col}$ to $Q_{col}$, and it therefore calls Match ($v_1$.asAnd( ),$q_1$.asAnd( )). For simplicity, the parameter M will be omitted throughout this example, since it behaves like a global variable consulted and updated by all functions. Since both arguments are passed as if they were and nodes, the types match and their children are compared in the doubly-nested loop.

From the inner loop, IsLink($v_2, q_2, v_1, q_1$) is called, from which Match($v_2, q_2$) is invoked. Again, both nodes have the same node test and no restrictions are present, so the first test succeeds. Then all the successors x' of view node $v_2$ must match. These are view nodes 3 and 4. For each of them, at least one matching query node y' must exist (see Condition 4.4). The candidates y' are among the successors of y, which for this example is the single or node 3 in the query. This results in the two calls IsLink($v_e, q_3, v_2, q_2$) and IsLink($v_4, q_3, v_2, q_2$), whose results are conjunctively connected (see Condition 4.4).

First, consider IsLink($v_3, q_3, v_2, q_2$). Using case 2, embodiments of the module 220 test Condition 4.3, by iterating over all successors of the query's or node to call IsLink($v_3, q_4, v_3, q_3$) and IsLink($v_3, q_8, v_3, q_3$). The first of these invocations calls IsLink($v_3, q_i, v_3, q_3$), where $q_i$ represents query nodes 5, 6, and 7. These calculate $q_i$/PE(c), which effectively evaluates $q_i$/descendant-or-self::c, returning $q_6$ in case of i=6 and no nodes for i∈{5,7}. This induces the call Match($v_3, q_6$), which returns true since c>1→c>0. Thus, the link ($v_3, q_6, v_3, q_3$) is recorded and the function returns true, but without recording the link ($v_3, q_4, v_3, q_3$).

Similarly, when processing IsLink $v_3, q_i, v_3, q_8$) for i∈{9, 11}, $q_i$/descendant-or-self::c returns $q_{10}$ in the case of i=9 and no nodes for i=11. The call to Match($v_3, q_{10}$) again returns true since c>2→c>0. This records link ($v_3, q_{10}, v_3, q_3$) and causes IsLink($v_3, q_8, v_3, q_3$) to return true, but without recording it as a link. Back on the stack, the call of IsLink($v_3, q_3, v_2, q_2$) in case 2 thus has had true returns from both calls, so it too returns true, producing the third link ($v_3, q_3, v_2, q_2$).

The call IsLink($v_4, q_3, v_2, q_2$) is treated similarly and produces the three links ($v_4, q_7, v_4, q_3$), ($v_4, q_9, v_4, q_3$), and ($v_4, q_3, v_2, q_2$). Finally, Match($v_2, q_2$) can return true, and IsLink records the final link ($v_2, q_2, v_1, v_1$).

Those code fragments that are not covered by the above example will now be discussed. Case 1 of IsLink records a link whenever the view node is nil so that the disjunction represented by the or node above it is always satisfied. Case 3 makes sure that if view node x is an or node, one of its successors is matched (representing Condition 4.2 exactly). Finally, case 4 handles situations where the view node is and (Condition 4.4), but recording the corresponding link only if the corresponding query node is also an and node.

III.E. Cleaning Module

The cleaning module 240 inputs the set of partial matches and outputs a set of candidate matches. The matching procedure does not check for parent compliance. Hence, it may be that links are recorded for which the parents subsequently failed to match. Such a links without a corresponding parent should be eliminated to produce a minimal cover.

Deleting a link that causes a violation of parent compliance cannot affect any other compliance, but parent compliance will again have to be checked for the smaller link set. FIG. 15 illustrates an exemplary implementation of the CleanUp function. The CleanUp procedure shown in FIG. 15 tests Condition 5, where '_' can match any value, iteratively removing links that violate the condition.

This leads to the following theorem used by embodiments of the module 260:

Theorem 2: The function MatchViewQuery produces a minimal cover for (V,Q) if and only if such a cover exists.

III.F. Match Extraction Module

The match extraction module 270 inputs the set of candidate matches and the definition of valid match and outputs a set of valid matches. To determine whether a relational view can be used to answer a relational query, first it needs to be ensured that the rows in the view cover all the rows required to answer the query. Then it needs to be ensured that each row in the view includes sufficient data to enforce any remaining restrictions. In other words, to eliminate view rows that do not participate in the query answer. If such data is not explicitly present in the view, it must be possible to obtain the needed data through back-joins to base tables. Finally, it needs to be ensured that there is enough data available in the view (or available through back-joins) to calculate the requested column values specified by the query. Existing algorithms can be used to address these three steps when atomic data values are involved, and MatchViewQuery(V,Q) addresses the existence questions in the context of XML data columns. For convenience, it has been assumed that database keys are present in the view and that all the ordpaths of all distinguished nodes are selected by the view, thus guaranteeing that back-joins will always be possible if the appropriate rows exist. What has not yet been addressed is how to extract required data values from any of the XML data columns involved in the materialized view when they are needed to eliminate extraneous rows or to populate a query's answers. That is, it has been determined whether a view is adequate, but it has not yet been described how it could actually be used.

To evaluate the query, a match is isolated to identify a binding in the materialized view for each distinguished node in MPT(Q). Starting with a minimal cover for (V,Q), the match extraction module works in two steps:

1. identify all valid matches, and
2. for each valid match, extract all the implied mappings for the distinguished query nodes.

For step one, all valid partial functions from view nodes to query nodes that are embedded in the minimal cover $H_c$ produced by MatchViewQuery, could naively be enumerated. Let f be one such partial function and, $$L_f = \{(x, f(x), x', y') \in H_c\}.$$

Because, $$L_f \subseteq H_c,$$

checking whether $L_f$ is a valid match requires that it is parent compliant and logic compliant (the other compliances cannot be violated by any subset of $H_c$). However, ensuring these conditions can instead be incorporated into the enumeration process that generates potential partial functions. Let F be the resulting set of partial functions, each of which corresponds to a valid match.

For each f∈F, every view node is uniquely mapped to a query node. However, mapping multiple view nodes to a single distinguished query node also needs to be avoided. Extracting partial functions from the inverse mappings makes up the second step. Given f∈F, let, $$f^{-1}(y) = \{\hat{x} | f(x) = y\}.$$

Let, $$q_i, i \in 1 \ldots d$$

be the distinguished nodes in query Q. An extracted match $m_f$ maps each distinguished query node $q_i$ to some view node $v_i$ such that $f(v_i) = q_i$ or to nil if $f^{-1}(q_i) = 0$. The pair $(f, m_f)$ is called an extracted match.

III.G. Substitute Query Construction Module

The substitute query construction module 290 inputs the set of valid matches and outputs the set of valid substitute query expressions. The general procedure to construct a query substitute from an extracted match $(f, m_f)$ will be outlined. Recall from above that that the view is a relation that includes an XML column for each of the projected nodes from MPT(V). If the query is not equivalent to the materialized view, compensations must be applied to the data in the view to produce the query answer. Thus, evaluating the query involves filtering the tuples in the materialized view V to preserve only those also selected by the query, applying the map $m_f$ to find corresponding nodes in MPT(V), and using both MPTs to determine how to extract data corresponding to the query's distinguished nodes from the view's projected nodes, how to correct for the possible occurrence of duplicates in the view that should not be in the query answer, and whether the query requires additional sorting to produce the final answers. The following sub-sections describe how to use the information in the extracted match $(f, m_f)$ and in the corresponding MPTs to derive these compensations.

For the remainder of this section, it will be assumed that a query substitute is being calculated with respect to a valid match fusing the inverse function $m_f$. For efficient execution, it is assumed that the Boolean matrix M computed by MatchViewQuery also records whether $f(v_i)$ would also match $v_i$ were the roles of V and Q reversed. In this case, it can be said that query node $f(v_i)$ is equivalent to view node $v_i$.

III.G.1 Constructing Residual Predicate Filters

Let w be some document sub-tree. It can be said that a node in an MPT holds if the corresponding part of w matches that node. Assume it is known that some node v∈MPT(V) holds, in other words, w satisfies the node under consideration in the view. Assume further that it is desired to check whether $f(v)$ holds, in other words, w satisfies the corresponding node in MPT(Q)).

Clearly, if v is equivalent to $f(v)$, then without any need for further testing of the instance, it is known that $f(v)$ holds for w. Furthermore if neither v nor $f(v)$ are function nodes, then their types must match (node test compliance). If the restrictions on those nodes are not equivalent, then the query condition must be tested explicitly on w. For example, if the view specifies price <100 and the query specifies price <50, the query's test must be applied to the data in the materialized view.

If neither v nor $f(v)$ is an or node, then their sub-trees are conjunctively connected. Let q be the root of one of the sub-trees of $f(v)$. If q is equivalent to some child of v, then q must hold for the corresponding substructure of w whenever v holds for w. Therefore, the sub-tree rooted at q in MPT(Q) cannot impose the need for any compensations. It can henceforth be ignored. The remaining conjuncts in a query require the generation of code to filter out less restrictive data from the materialized view.

Similarly, filters must be applied when disjuncts in the view might cause extraneous data to be included in the view. Let, $$or_q \in MPT(Q)$$

be an or node, let v be a node in MPT(V) that is mapped to it ($f(v) = or_q$), and let w be a fragment of the materialized view for which v holds. The following strategy is potentially much more efficient than evaluating $or_q$ against w.

Case 1: v is an or node. Because of logic compliance (Condition 4.1 followed by Condition 4.2b), for every disjunct under $or_q$, there exists a disjunct under v that maps to it. Let, $$x_i (1 \leq i \leq k) \text{ and } z_j (1 \leq j \leq m)$$

be all the successor nodes of v such that for every $x_i$ there exists a successor node $y_i$ of $or_q$ such that $y_i = f(x_i)$ and none of $z_j$ is mapped via f to a node in MPT(Q) (in other words, $f(z_j)$ is undefined).

Case 2: v is not a function node. Because of Condition 4.3, f maps v to some node within every disjunct under $or_q$. For simplicity, for this situation, k=1, m=0, and $x_1$=v.

Using the following procedure, a decision tree (or an equivalent Boolean expression to be evaluated lazily) can now be built to test whether $or_q$ holds for w. As part of view materialization, a bitmap is associated with every or node in the view recording which successor(s) hold on that part of the data. This bitmap is also very helpful in maintaining the materialized view. To check whether $or_q$ holds, first each of the $x_i$ associated with v are checked.

Figure 16:
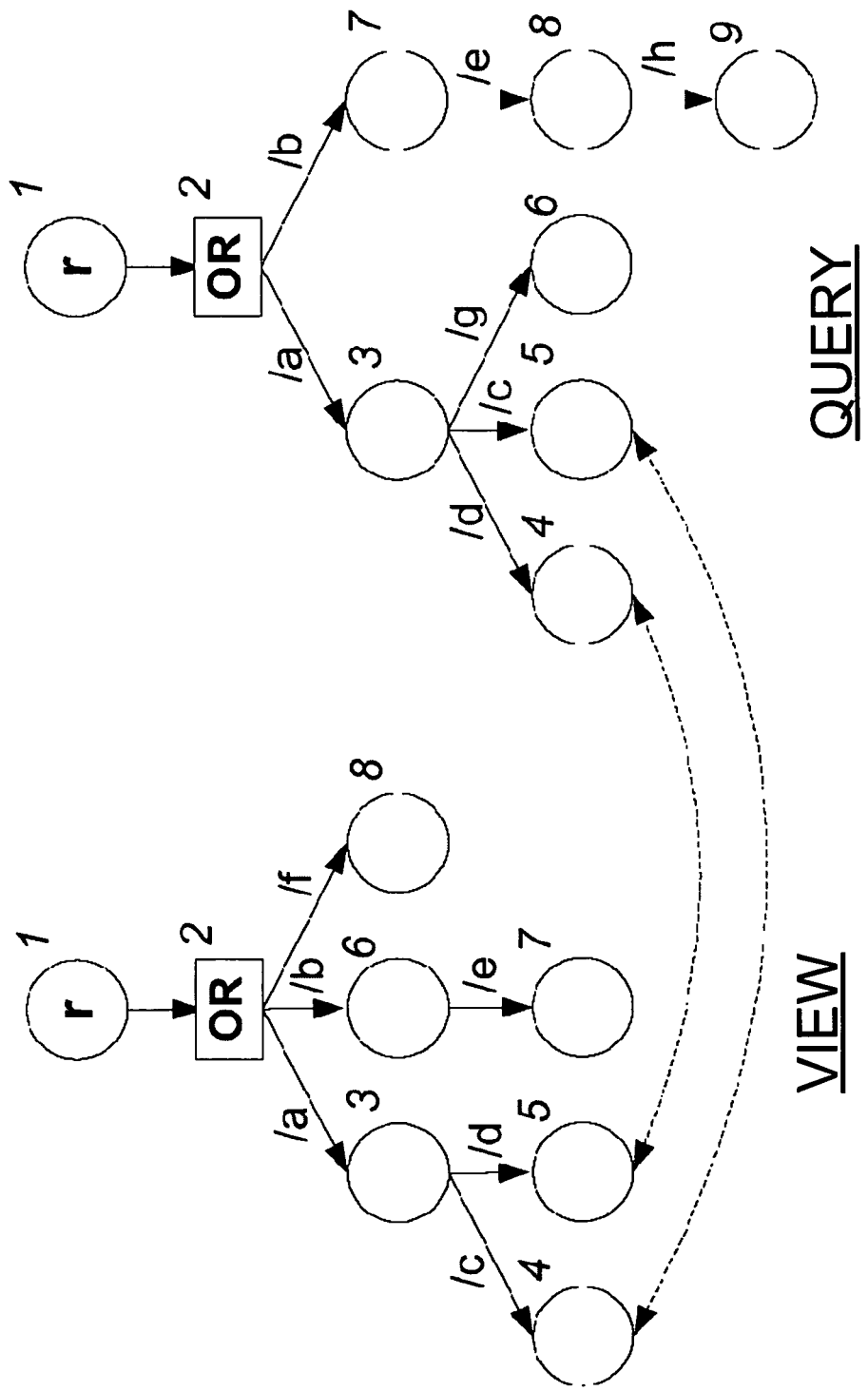
FIG. 16 illustrates an exemplary example of a sample view and query.

FIG. 16 illustrates an exemplary example of a sample view and query, for which $x_1$ refers to view node 3 and $x_2$ refers to view node 6. Whether or not a document fragment w matched by view node 2 has some child f is irrelevant to determining whether $or_q$ holds. View node 8 corresponds to $z_1$ which has no image in the query.

If w has either an a or a b substructure, an expression $E_r$ should be evaluated to determine whether the corresponding child node of $or_q$ holds. First, it can be checked whether $x_i$ holds by looking in the bitmap for v. If the entry is false, $y_i$ cannot hold. If $x_i$ holds, the matrix produced by MatchViewQuery can be checked to see whether $x_i \equiv y_i$. If this is true, then $y_i$ must also hold. If not, $y_i$ must be checked explicitly. Continuing the example, if it is known that view node 2 holds, at most the tests for a/g and b/e/h need be evaluated against the data:

$$a[c \hat{/} d] \text{ and } b/e$$

can be tested against the bitmap, $a_v.aq$ and $b_v = b_q$ can be tested against the matrix, and if $x_1$ holds, then a is already known to have children c and d (sub-trees rooted at query nodes 4 and 5 are ignored because they are conjunctively connected node with equivalent nodes in the view).

Finally, consider a maximal path leading to any node y in the query pattern tree such that on this path (except for y) no residual predicate has been identified as needing to be tested. If the nodes in the path are not equivalent to the mapped-from nodes in the view, then a residual predicate has to be applied to ensure that w matches all nodes along the query path.

III.G.2 Constructing Continuations

A procedure for constructing continuations is best explained by an example. Let R be a relation with key id and XML attribute r and let a materialized view be:

```
select id, r as rv,
    a.ordpath( ) as av,
    b.ordpath( ) as bv,
    c.ordpath( ) as cv, e.ordpath( ) as ev
from R outer apply r.(.//a) as A(a)
    outer apply a.(.//b) as B(b)
    outer apply b.(.//c) as C(c)
    outer apply c.(.//e) as E(e)
```

Consider the query:

```
select id, r.query(
    for $a in ./a, $c in $a//b//c,
    $d in $c//d, $e in $d//e,
    $g in $e//g return E)
from R
``` where E is an arbitrary XML expression involving the variables {$a; $c; $d; $e; $g}. The nodes in MPT(V) are referred to as {rv; av; bv; cv; ev}, and the nodes in MPT(Q) are referred to as {r,a,c,d,e,g}.

A distinguished query node y is covered if $m_f(y)$ is a projected view node. For the current example, $f(rv)=r$, $f(av)=a$, $f(cv)=c$, $f(ev)=e$. The query nodes r, a, c, and e are covered, while d and g are not covered.

Next, a binding table of the following form is filled out:

$$\langle T, s, P, c \rangle.$$

One tuple in this table records the fact that the necessary bindings for the query node (T) can be derived by applying the path expression (P) to the view or query node (S). Additionally, since this may produce a superset, the predicates (C) have to be applied.

Let y be a distinguished query node and $m_f(y)$ be a projected view node. The tuple, $$(y, m_f(y), \text{'.'}, \sigma_y)$$

is added to a table where $\sigma_y$ is the residual predicate for y, as explained above. In the current example, this results in entries for r, a, c, and e. After this step, what is possibly left are some query nodes that do not occur in the first column of the binding table. Any query node is bound if it occurs in the first column of the binding table. Otherwise, it is called unbound. Note that the root of the query must be bound for the view to qualify as a match (root compliance).

Consider a pair of distinguished nodes (y, y') related by a cross or outer apply, with y bound and y' unbound. There are two cases:

1. If some descendant of y' has an entry in the binding table, let y" be the closest such descendant and let x be the projected view node such that $f(x)=y"$.

Let y ... y' ... y" be the path of edges connecting y to y" and let $y_j$ be all the distinguished nodes along that path, $$(0 \leq j \leq n, y_0 = y, y_1 = y', y_n = y").$$

For all j in the range $1 \leq j < n$, add, $$(y_j, y_{j+1}, \overline{PE}(y_j, y_{j+1}), \sigma_j)$$

to the binding table, where, $$\overline{PE}(y_j, y_{j+1})$$

is the backward path from $y_j$ to $y_{j-1}$ and $\sigma_j$ is the residual predicate for $y_j$. The expression, $$y = y'/\overline{PE}(y, y')$$

is also conjoined to the predicates in the entry for $y_0$.

2. If there is no bound descendant of $y_0$, the tuple, can be added to the binding table, where $\sigma_{y'}$ is the residual predicate for y'.

These steps are applied until all distinguished variables of the query are bound. Consider the current example, where c is bound and d is unbound. Since the successor node e of d is bound, case 1 can be applied, which results in the entry, $$(d, e, anc::d, c = d/anc::c)$$

The other unbound query node is g, to which case 2 applies. Hence, the term, $$(g, ev, .//g, \text{true})$$

is added.

Finally, for every projected view node x, if $f(x)$ is a distinguished node that was introduced from an application of cross apply, then the filter "x IS NOT NULL" should be added.

III.G.3 Constructing Correctives

If there exists any distinguished node in the view that is not mapped to a distinguished query node, the corresponding column from the materialized view is not involved in the query substitute. In this case, a duplicate eliminating projection on the set $Y_d$ of the distinguished nodes of the query must be performed. Using the above example, there is an additional distinguished view node bv. Thus, there could be multiple b nodes on the path from a to c in the document instance, each of which is matched by bv. Therefore, duplicates must be eliminated.

If some distinguished query nodes are not also projected nodes, there will be too much unnesting produced by the compensations described so far. Let $$Y = \{y_1 \ldots y_n\}$$

Be the distinguished nodes of the query that are bound by for entries in a query and do not appear in the select clause of the query. If n>0, a grouping should be added on the complement of, $$Y(\overline{Y} = Y_{d/Y})$$

Considering the above example again, the application of apply operators on path expressions leads to an unnested materialized view, where each tuple in R gives rise to many tuples in the materialized view. In contrast, because of the semantics of XML and SQL, the example query returns one tuple for every tuple in R, including a sequence of items found by evaluating E on all possible bindings for $a, $c, $d, $e, $g. For a given tuple in R, this set of bindings can be constructed by grouping the materialized view on the key id.

Finally XQuery may impose a certain order on the variable bindings. If so, an additional sort is required. Since no order is imposed on the tuples in the materialized view, and given the fact that the example query may be run in XQuery's ordered mode, each set of bindings should be sorted. In other words, each group, on the ordpaths of $a, $c, $d, $e, $f in this order.

IV. Exemplary Operating Environment

Embodiments of the materialized XML view matching system 100 and method are designed to operate in a computing environment. The following discussion is intended to provide a brief, general description of a suitable computing environment in which embodiments of the materialized XML view matching system 100 and method may be implemented.

Figure 17:
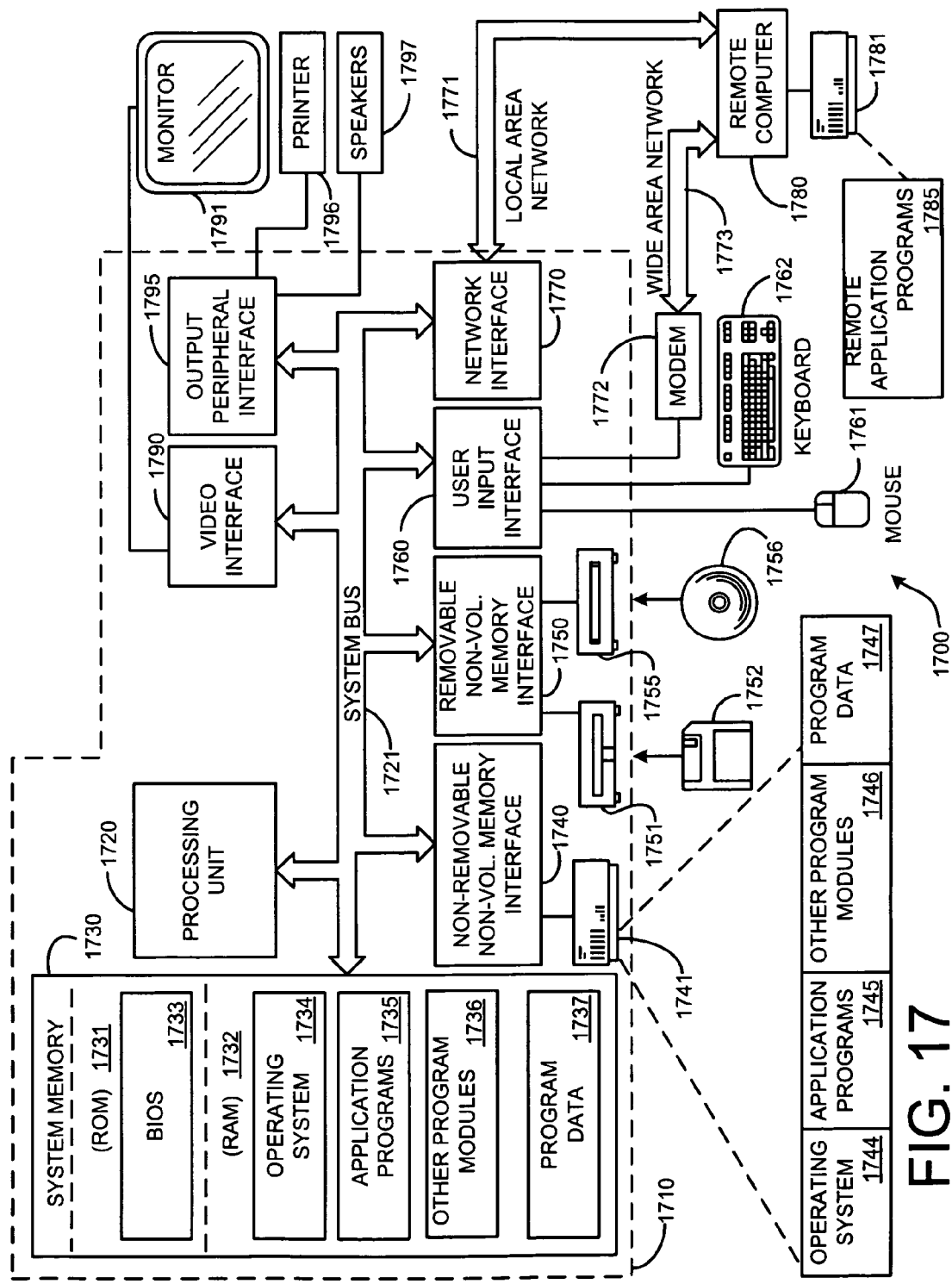
FIG. 17 illustrates an example of a suitable computing system environment in which embodiments of the materialized XML view matching system and method shown in FIGS. 1-16 may be implemented.

FIG. 17 illustrates an example of a suitable computing system environment in which embodiments of the materialized XML view matching system 100 and method shown in FIGS. 1-16 may be implemented. The computing system environment 1700 is only one example of a suitable computing environment and is not intended to suggest any limitation as to the scope of use or functionality of the invention. Neither should the computing environment 1700 be interpreted as having any dependency or requirement relating to any one or combination of components illustrated in the exemplary operating environment.

Embodiments of the materialized XML view matching system 100 and method are operational with numerous other general purpose or special purpose computing system environments or configurations. Examples of well known computing systems, environments, and/or configurations that may be suitable for use with embodiments of the materialized XML view matching system 100 and method include, but are not limited to, personal computers, server computers, handheld (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the materialized XML view matching system 100 and method may be described in the general context of computer-executable instructions, such as program modules, being executed by a computer. Generally, program modules include routines, programs, objects, components, data structures, etc., that perform particular tasks or implement particular abstract data types. Embodiments of the materialized XML view matching system 100 and method may also be practiced in distributed computing environments where tasks are performed by remote processing devices that are linked through a communications network. In a distributed computing environment, program modules may be located in both local and remote computer storage media including memory storage devices. With reference to FIG. 17, an exemplary system for embodiments of the materialized XML view matching system 100 and method includes a general-purpose computing device in the form of a computer 1710.

Components of the computer 1710 may include, but are not limited to, a processing unit 1720 (such as a central processing unit, CPU), a system memory 1730, and a system bus 1721 that couples various system components including the system memory to the processing unit 1720. The system bus 1721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1710 typically includes a variety of computer readable media. Computer readable media can be any available media that can be accessed by the computer 1710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1710. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1740 includes computer storage media in the form of volatile and/or nonvolatile memory such as read only memory (ROM) 1731 and random access memory (RAM) 1732. A basic input/output system 1733 (BIOS), containing the basic routines that help to transfer information between elements within the computer 1710, such as during start-up, is typically stored in ROM 1731. RAM 1732 typically contains data and/or program modules that are immediately accessible to and/or presently being operated on by processing unit 1720. By way of example, and not limitation, FIG. 17 illustrates operating system 1734, application programs 1735, other program modules 1736, and program data 1737.

The computer 1710 may also include other removable/non-removable, volatile/nonvolatile computer storage media. By way of example only, FIG. 17 illustrates a hard disk drive 1741 that reads from or writes to non-removable, nonvolatile magnetic media, a magnetic disk drive 1751 that reads from or writes to a removable, nonvolatile magnetic disk 1752, and an optical disk drive 71055 that reads from or writes to a removable, nonvolatile optical disk 1756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1741 is typically connected to the system bus 1721 through a non-removable memory interface such as interface 1740, and magnetic disk drive 1751 and optical disk drive 1755 are typically connected to the system bus 1721 by a removable memory interface, such as interface 1750.

The drives and their associated computer storage media discussed above and illustrated in FIG. 17, provide storage of computer readable instructions, data structures, program modules and other data for the computer 1710. In FIG. 17, for example, hard disk drive 1771 is illustrated as storing operating system 1744, application programs 1745, other program modules 1746, and program data 1747. Note that these components can either be the same as or different from operating system 1734, application programs 1735, other program modules 1736, and program data 1737. Operating system 1744, application programs 1745, other program modules 1746, and program data 1747 are given different numbers here to illustrate that, at a minimum, they are different copies. A user may enter commands and information (or data) into the computer 1710 through input devices such as a keyboard 1762, pointing device 1761, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1720 through a user input interface 1760 that is coupled to the system bus 1721, but may be connected by other interface and bus structures, such as, for example, a parallel port, game port or a universal serial bus (USB). A monitor 1791 or other type of display device is also connected to the system bus 1721 via an interface, such as a video interface 1790. In addition to the monitor, computers may also include other peripheral output devices such as speakers 1797 and printer 1796, which may be connected through an output peripheral interface 1795.

The computer 1710 may operate in a networked environment using logical connections to one or more remote computers, such as a remote computer 1780. The remote computer 1780 may be a personal computer, a server, a router, a network PC, a peer device or other common network node, and typically includes many or all of the elements described above relative to the computer 1710, although only a memory storage device 1781 has been illustrated in FIG. 17. The logical connections depicted in FIG. 17 include a local area network (LAN) 1771 and a wide area network (WAN) 1773, but may also include other networks. Such networking environments are commonplace in offices, enterprise-wide computer networks, intranets and the Internet.

When used in a LAN networking environment, the computer 1710 is connected to the LAN 1771 through a network interface or adapter 1770. When used in a WAN networking environment, the computer 1710 typically includes a modem 1772 or other means for establishing communications over the WAN 1773, such as the Internet. The modem 1772, which may be internal or external, may be connected to the system bus 1721 via the user input interface 1760, or other appropriate mechanism. In a networked environment, program modules depicted relative to the computer 1710, or portions thereof, may be stored in the remote memory storage device. By way of example, and not limitation, FIG. 17 illustrates remote application programs 1785 as residing on memory device 1781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for matching materialized XML views, comprising:
    inputting a query expression and a view expression;
    constructing a multi-path tree (MPT) data structure for the query expression and the view expression;
    normalizing the MPT data structure via a plurality of transformations that include:
        changing occurrences of an attribute axis in the MPT data structure to a child axis in the MPT data structure to generate normalized MPT data structures,
        combining successive AND nodes, OR nodes, and nodes in the MPT data structure that are linked by a self axis,
        pushing OR nodes in the MPT data structure down over common prefixes, and
        removing NIL nodes in the MPT data structure that occur in conjunctions or that occur with other NIL nodes in disjunctions; and
    performing view matching of the normalized MPT data structures to generate a set of partial matches that represent possible matches for the materialized XML views.

2. The computer-implemented method of claim 1, further comprising cleaning up the set of partial matches by identifying and removing those partial matches that cannot be part of a complete match to generate a set of candidate matches.

3. The computer-implemented method of claim 2, further comprising removing any match in the set of candidate matches that is not parent compliant.

4. The computer-implemented method of claim 2, further comprising defining what constitutes a valid match.

5. The computer-implemented method of claim 4, further comprising defining root compliance, node-test compliance, restriction compliance, logic compliance, and parent compliance as conditions for the valid match.

6. The computer-implemented method of claim 5, further comprising defining a match as valid if the match is root compliant, node-test compliant, restriction compliant, logic compliant, and parent compliant.

7. The computer-implemented method of claim 4, further comprising performing match extraction on the set of candidate matches using the valid match definition to generate a set of valid matches.

8. The computer-implemented method of claim 7, further comprising constructing a substitute query expression for each valid match in the set of valid matches to generate a set of valid substitute query expressions for the query expression for processing by a database management system (DBMS) engine.

9. The computer-implemented method of claim 8, wherein constructing a substitute query expression further comprises constructing residual predicate filters for the normalized MPT data structures.

10. The computer-implemented method of claim 9, wherein constructing a substitute query expression further comprises constructing continuations for the normalized MPT data structures.

11. The computer-implemented method of claim 10, wherein constructing a substitute query expression further comprises constructing correctives for the normalized MPT data structures.

12. The computer-implemented method of claim 1, wherein the plurality of transformations include: pulling OR nodes in the MPT data structure up whenever they have a sibling node, and ensuring that AND nodes in the MPT data structure appear only under OR nodes and only when there are multiple conjuncts.

13. A computer storage device storing computer-executable instructions for matching materialized XML views, the computer-executable instructions configured to cause one or more processors to:
input a query expression and a view expression;
construct a multi-path tree (MPT) data structure for the query expression and the view expression;
normalize the MPT data structure via a plurality of transformations that include:
changing occurrences of an attribute axis in the MPT data structure to a child axis in the MPT data structure to generate normalized MPT data structures,
combining successive AND nodes, OR nodes, and nodes in the MPT data structure that are linked by a self axis,
pushing OR nodes in the MPT data structure down over common prefixes, and
removing NIL nodes in the MPT data structure that occur in conjunctions or that occur with other NIL nodes in disjunctions; and
perform view matching of the normalized MPT data structures to generate a set of partial matches that represent possible matches for the materialized XML views.

14. The computer storage device of claim 13, wherein the plurality of transformations include: pulling OR nodes in the MPT data structure up whenever they have a sibling node, and ensuring that AND nodes in the MPT data structure appear only under OR nodes and only when there are multiple conjuncts.

15. The computer storage device of claim 13, wherein the computer-executable instructions are configured to cause the one or more processors to clean up the set of partial matches by identifying and removing those partial matches that cannot be part of a complete match to generate a set of candidate matches.

16. The computer storage device of claim 15, wherein the computer-executable instructions are configured to cause the one or more processors to remove any match in the set of candidate matches that is not parent compliant.

17. The computer storage device of claim 13, wherein the computer-executable instructions are configured to cause the one or more processors to define what constitutes a valid match.

18. The computer storage device of claim 17, wherein the computer-executable instructions are configured to cause the one or more processors to define root compliance, node-test compliance, restriction compliance, logic compliance, and parent compliance as conditions for the valid match.

19. A system for matching materialized XML views comprising:
one or more processors; and
one or more computer storage devices storing computer-executable instructions configured to cause the one or more processors to:
input a query expression and a view expression;
construct a multi-path tree (MPT) data structure for the query expression and the view expression;
normalize the MPT data structure via a plurality of transformations that include:
changing occurrences of an attribute axis in the MPT data structure to a child axis in the MPT data structure to generate normalized MPT data structures,
combining successive AND nodes, OR nodes, and nodes in the MPT data structure that are linked by a self axis,
pushing OR nodes in the MPT data structure down over common prefixes, and
removing NIL nodes in the MPT data structure that occur in conjunctions or that occur with other NIL nodes in disjunctions; and
perform view matching of the normalized MPT data structures to generate a set of partial matches that represent possible matches for the materialized XML views.

20. The system of claim 19, wherein the plurality of transformations include: pulling OR nodes in the MPT data structure up whenever they have a sibling node, and ensuring that AND nodes in the MPT data structure appear only under OR nodes and only when there are multiple conjuncts.

* * * * *